United States Patent
Palaniappan et al.

(10) Patent No.: US 10,863,344 B2
(45) Date of Patent: Dec. 8, 2020

(54) SYSTEMS AND METHODS FOR BETTER RESOURCE UTILIZATION IN 5G NETWORKS USING ENABLEMENT LAYER

(71) Applicant: Samsung Electronics Co., Ltd., Suwon-si (KR)

(72) Inventors: Ramanathan Palaniappan, Bangalore (IN); Ratnakar Rao Venkata Rayavarapu, Bangalore (IN); Prakash Rao, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/428,817

(22) Filed: May 31, 2019

(65) Prior Publication Data
US 2019/0373443 A1    Dec. 5, 2019

(30) Foreign Application Priority Data

Jun. 1, 2018 (IN) .............................. 201841020690
May 23, 2019 (IN) .............................. 201841020690

(51) Int. Cl.
*H04M 3/00* (2006.01)
*H04W 8/18* (2009.01)
*H04W 60/00* (2009.01)

(52) U.S. Cl.
CPC ............. *H04W 8/18* (2013.01); *H04W 60/00* (2013.01)

(58) Field of Classification Search
CPC ................................ H04W 8/18; H04W 60/00
USPC ................................................. 455/418, 420
See application file for complete search history.

(56) References Cited

U.S. PATENT DOCUMENTS

| | | | |
|---|---|---|---|
| 10,110,495 B1* | 10/2018 | Sabella | H04M 15/8083 |
| 10,440,096 B2* | 10/2019 | Sabella | G06F 9/505 |
| 10,567,291 B2* | 2/2020 | Sabella | H04M 15/8033 |
| 2011/0088068 A1 | 4/2011 | Patnoe et al. | |
| 2014/0162632 A1 | 6/2014 | Gajula et al. | |
| 2014/0204909 A1* | 7/2014 | Cheng | H04W 8/082 370/331 |
| 2017/0086049 A1* | 3/2017 | Vrzic | H04L 45/306 |
| 2017/0272330 A1* | 9/2017 | Cao | H04W 84/045 |
| 2017/0339609 A1 | 11/2017 | Youn et al. | |
| 2018/0183855 A1* | 6/2018 | Sabella | G06F 9/505 |
| 2018/0310238 A1* | 10/2018 | Opsenica | H04W 12/06 |

(Continued)

OTHER PUBLICATIONS

ISA/KR, International Search Report and Written Opinion of the International Searching Authority, International Application No. PCT/KR2019/006564, dated Sep. 18, 2019, 9 pages.

(Continued)

*Primary Examiner* — Marceau Milord

(57) ABSTRACT

A method for improved resource utilization in 5G networks includes determining at least one network parameter in response to a request received from a user for the at least one service at a particular location, wherein the at least one network parameter includes at least one of an availability of at least one edge server, a Round Trip Time (RTT), an End-to-End (E2E) delay and a network rating. Further, the method includes providing at least one recommendation for performing the at least one requested service on the UE based on the determined at least one network parameter. The at least one recommendation include at least one of an application, a RAT, a SIM and a network slice of the SIM.

18 Claims, 34 Drawing Sheets

(56) References Cited

U.S. PATENT DOCUMENTS

| | | | |
|---|---|---|---|
| 2018/0376338 A1* | 12/2018 | Ashrafi | H04L 67/10 |
| 2019/0045034 A1* | 2/2019 | Alam | H04L 49/3009 |
| 2019/0132767 A1* | 5/2019 | Shi | H04W 24/08 |
| 2019/0149365 A1* | 5/2019 | Chatterjee | H04L 25/0226 |
| | | | 370/329 |
| 2019/0174449 A1* | 6/2019 | Shan | H04W 60/04 |
| 2019/0174466 A1* | 6/2019 | Zhang | H04L 5/005 |
| 2019/0245789 A1* | 8/2019 | Sabella | H04L 12/1407 |
| 2019/0319858 A1* | 10/2019 | Das | H04L 27/2637 |
| 2020/0076875 A1* | 3/2020 | Sabella | H04L 67/10 |
| 2020/0145787 A1* | 5/2020 | Roy Choudhury | H04W 64/003 |

OTHER PUBLICATIONS

CMCC, "Discussion on RAN support of edge computing in NR," R2-1808566 resubmission of R2-1805533, 3GPP TSG-RAN WG2 Meeting #102, Busan, Korea, May 21-25, 2018, 5 pages.

ETSI GS MEC 016 V1.1.1 (Sep. 2017), "Mobile Edge Computing (MEC); UE application interface," Group Specification, Sep. 2017, 21 pages.

* cited by examiner

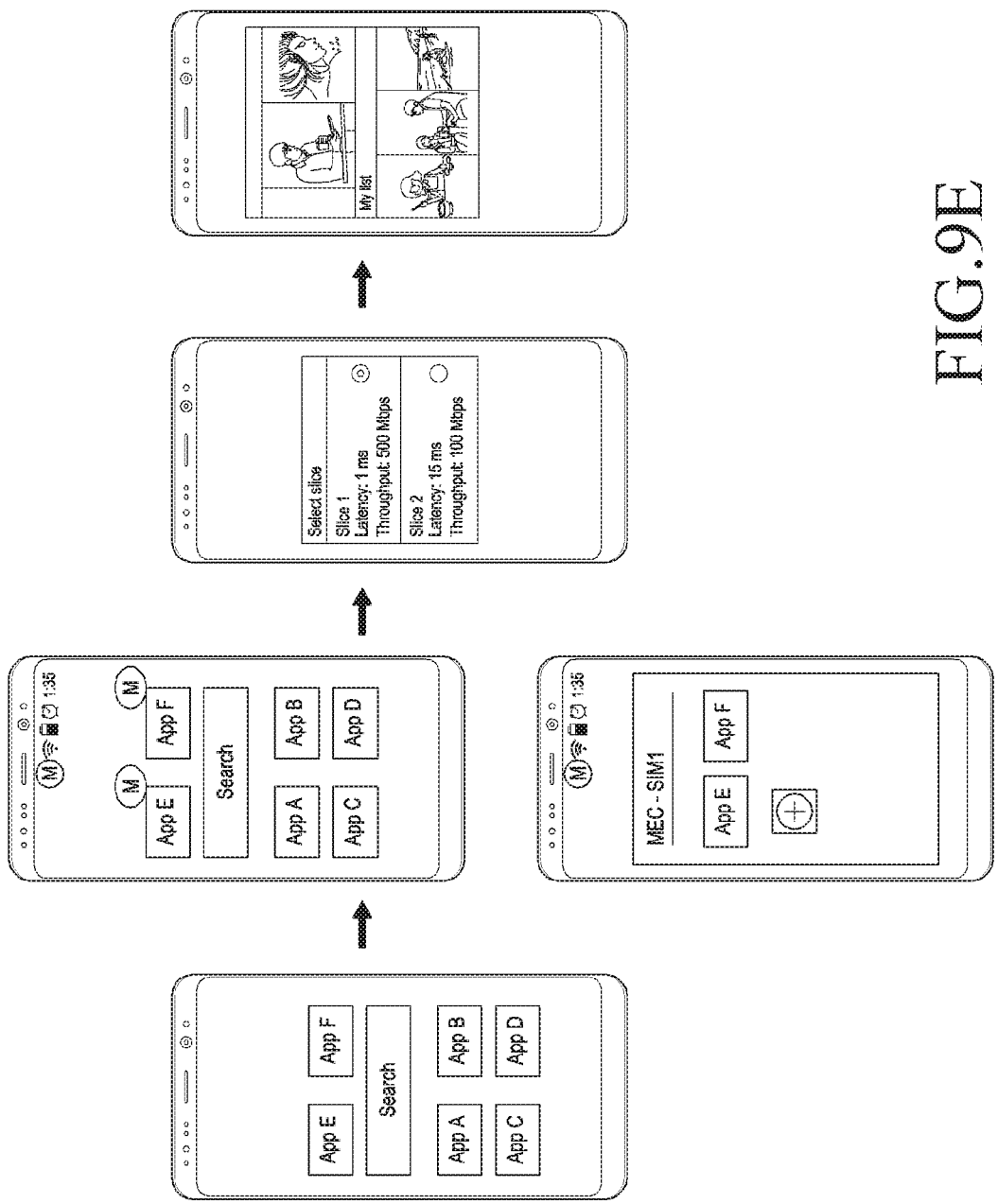

| Signal Strength Thresholds(SS) | |
|---|---|
| SS | Value |
| SS >= -90dbm | 5 |
| -90 > SS >= -100 | 4 |
| -100 > SS >= -105 | 3 |
| -105 > SS >= -120 | 2 |
| -120 > SS | 1 |

FIG.11A

| Charging Thresholds(C) | |
|---|---|
| Rate per 100 GB of data ( $ ) | Value |
| C <= 5 | 5 |
| 5 < C <=10 | 4 |
| 10 < C <=15 | 3 |
| 15 < C <=20 | 2 |
| C > 20 | 1 |

FIG.11B

| RTT Thresholds | |
|---|---|
| RTT (in msec) | Value |
| RTT <= 5 | 5 |
| 5 < RTT <=50 | 4 |
| 50 < RTT <=100 | 3 |
| 100 < RTT <=500 | 2 |
| RTT > 500 | 1 |

FIG.11C

| Network Load(NL) | |
|---|---|
| Load Condition | Value |
| Not Loaded | 1 |
| Loaded | 0 |

FIG.11D

| EDGE Availability - E | |
|---|---|
| EDGE Availability | Value |
| EDGE Available | 1 |
| EDGE Not available | 0 |

FIG.11E

| Slice Availability - S | |
|---|---|
| Slice Availability | Value |
| Matching Slice Available | 1 |
| Matching Slice Not Available | 0 |

FIG.11F

| Weightages for Cost effective(w) | |
|---|---|
| Charge | 0.7 |
| EDGE availability | 0.1 |
| Slice availability | 0.1 |
| Signal strength | 0.05 |
| Network load | 0.05 |

FIG.11G

| Weightages for Performance(Latency) (w) | |
|---|---|
| Charge | 0.1 |
| EDGE availability | 0.3 |
| Slice availability | 0.3 |
| Signal strength | 0.15 |
| Network load | 0.15 |

FIG.11H

| Parameters | Application-A | Application-B |
|---|---|---|
| Signal strength | -85db | -85db |
| Network load information | Not loaded | Not loaded |
| RTT | Not applicable | Not applicable |
| Edge server | Not available | available |
| Matching slice | Not available | available |
| Cost | 6 $ per 100 GB | 12 $ per 100 GB |

FIG.13

| Parameters | Application-A | Application-B |
|---|---|---|
| Signal strength | -85db | -90db |
| Network load information | Not loaded | Not loaded |
| RTT | Not applicable | Not applicable |
| Edge server | Not available | Not available |
| Matching slice | Not available | available |
| Cost | 9 $ per 100 GB | 12 $ per 100 GB |

FIG.14A

| Parameters | Application-A | Application-B |
|---|---|---|
| Signal strength | -85db | -90db |
| Network load information | Not loaded | Not loaded |
| RTT | Not applicable | Not applicable |
| Edge server | Not available | available |
| Matching slice | Not available | available |
| Cost | 3 $ per 100 GB | 12 $ per 100 GB |

FIG.14B

| Multi SIM network/App parameters | Edge availability | Slice characteristics | Dynamic QoS | RTT | E2E |
|---|---|---|---|---|---|
| Operator 1 Cell 1 | Yes | Low latency | Yes | X msec | Y msec |
| Operator 1 Cell 2 | | | | | |
| Operator 2 Cell 1 | No | Low latency | Yes | X+d1 msec | Y+d2 msec |
| Operator 2 Cell 2 | | | | | |
| WiFi | | | | | |

FIG. 17B

SYSTEMS AND METHODS FOR BETTER RESOURCE UTILIZATION IN 5G NETWORKS USING ENABLEMENT LAYER

CROSS REFERENCE TO RELATED APPLICATIONS

This application is based on and claims priority under 35 U.S.C. § 119 to Indian Provisional Patent Application No. 201841020690 (PS), filed on Jun. 1, 2018, in the India Intellectual Property Office, and Indian Complete Patent Application No. 201841020690 (CS), filed on May 23, 2019, in the Indian Intellectual Property Office, the entire disclosures of which are incorporated by reference herein in their entirety.

BACKGROUND

1. Field

The present disclosure relates to the field of mobile edge computing (MEC) and more particularly to determine availability of network resources for providing recommendations to improve resource utilization by a User Equipment (UE) in a Fifth Generation (5G) network.

2. Description of Related Art

In Fifth Generation (5G) networks, there are several requirements and architectural enablers for enabling low latency communications and application component offloading. The low latency communications and the application component offloading improve a delivery of content and applications to/from users. To support such low latency communications and the application component offloading, Mobile Edge Computing (MEC) has been developed. In the MEC, a Mobile Edge Computing Server (MECS)/edge server can be placed in proximity to Access Points (APs-base stations in communication with a User Equipment (UE)) in a mobile network. Thus, the MEC enables operators to better adapt traffic to prevailing radio conditions, optimize service quality and improve network efficiency. Applications of the MEC include Self-Driving, Gaming, Virtual/Augmented Reality (AR), Remote Tele-surgery and so on.

In conventional approaches, the UE requests the edge server for a list of available user applications for a particular service and notifies the users about the user applications available at the edge server for the particular service. However, at any point in time, the performance of the user applications may vary depending on factors such as, but not limited to, current location, network load, presence/absence of network resources (such as edge servers, Radio Access Technology (RAT)), availability of network slices and so on.

SUMMARY

The principal object of the embodiments herein is to disclose methods and systems for providing recommendations to complete at least one service by a User Equipment (UE) at a particular location based on availability of network resources, wherein the recommendations include at least one of an application, a Subscriber Identity Module (SIM), a network slice, a Radio Access Technology (RAT) and so on.

Another object of the embodiments herein is to disclose methods and systems for determining the availability of an edge server for one or more applications supporting the at least one service.

Another object of the embodiments herein is to disclose methods and systems for recommending an application for completing a requested service based on at least one of a Round Trip Time and an End-to-End (E2E) delay determined for one or more applications supporting the requested service.

Another object of the embodiments herein is to disclose methods and systems for enabling the UE to provide information about network parameters to the edge server and to query the edge server for recommending the application for completing the requested service.

Another object of the embodiments herein is to disclose methods and systems for determining a network rating to recommend at least one of the application, the RAT/subscription and the SIM for completing the requested service at the particular location.

Accordingly, the embodiments herein provide methods and systems for providing recommendations to perform at least one service on a User Equipment (UE). A method disclosed herein includes determining at least one network parameter in response to a request received from a user for the at least one service at a location, wherein the at least one network parameter includes at least one of an availability of at least one edge server, a Round Trip Time (RTT), an End-to-End (E2E) delay, availability of network slices for at least one SIM, Radio Access Technology (RAT), characteristics of the available network slices, charging details, signal conditions and network load. Further, the method includes performing the at least one requested service by determining at least one recommendation based on the determined at least one network parameter.

Accordingly, embodiments herein provide a User Equipment (UE) supporting at least one Subscriber Identity Module (SIM) and at least one Radio Access Technology (RAT). The UE comprises a transceiver, a memory and at least one processor coupled to the memory and the transceiver. The at least one processor is configured on the user equipment to determine at least one network parameter in response to a request received from a user for the at least one service at a location, wherein the at least one network parameter includes at least one of an availability of at least one edge server, a Round Trip Time (RTT), an End-to-End (E2E) delay, Radio Access Technology (RAT), availability of network slices for at least one SIM, characteristics of the available network slices, charging details, signal conditions and network load. The enablement module is further configured to perform the at least one requested service by determining at least one recommendation based on the determined at least one network parameter.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which:

FIG. 9E is an example diagram illustrating providing of user notifications for indicating the availability of an edge server, according to embodiments as disclosed herein;

FIGS. 11A-11H depict example tables, wherein values of the table can be used for determining a network rating, according to embodiments as disclosed herein;

FIG. 13 is an example table illustrating availability of an edge server/network slice of a SIM for recommending an application for a requested service at a particular location, according to embodiments as disclosed herein;

FIGS. 14A and 14B depict example tables, wherein the values of the example table are used to recommend a SIM for a requested service at a particular location, according to embodiments as disclosed herein;

FIGS. 17A and 17B are example diagrams illustrating updating of network capabilities based on a cell change for recommending at least one of a network slice and a RAT for a requested service, according to embodiments as disclosed herein;

DETAILED DESCRIPTION

Figure 1A:
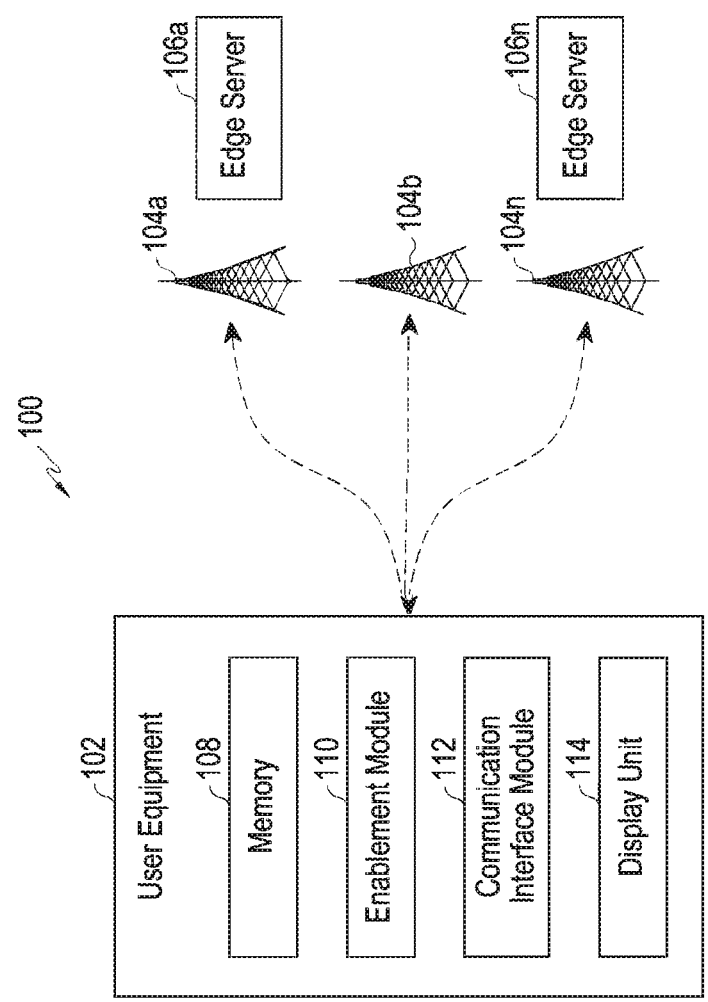
FIGS. 1A and 1B illustrate a communication system for providing recommendations to a user to complete service(s) at a particular location, according to embodiments as disclosed herein.

FIGS. 1A through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein disclose methods and systems for providing recommendations for completing at least one service by a User Equipment (UE) at a particular location, wherein the recommendations include at least one of an application, a Radio Access Technology (RAT)/subscription, a Subscriber Identity Module (SIM), a network slice of the one or more SIMs and so on. Referring now to the drawings, and more particularly to FIGS. 1 through 20, where similar reference characters denote corresponding features consistently throughout the figures, there are shown example embodiments.

Figure 1B:
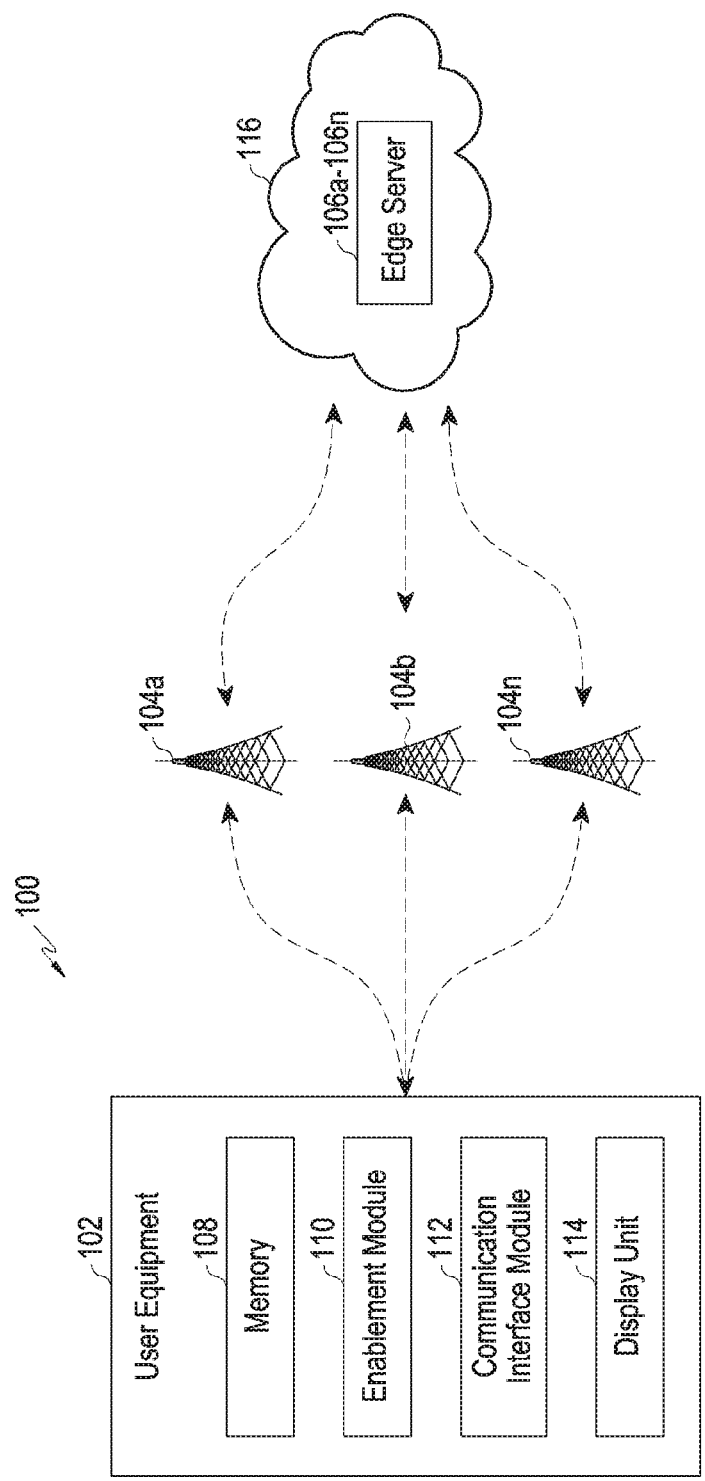

FIGS. 1A and 1B illustrate a communication system 100 for providing recommendations to a user to complete service(s) at a particular location, according to embodiments as disclosed herein. The communication system 100 can be configured to provide content such as, but not limited to, voice, data, video, messaging broadcast, and so on to multiple users in accordance with European Telecommunications Standards Institute (ETSI) Mobile Edge Computing (MEC). The communication system 100 includes a User Equipment 102, base stations 104a-104n and edge servers 106a-106n.

The UE 102 referred herein can be, any device supporting one or more Subscriber Identity Modules (SIM) and including 5G device characteristics. Examples of the UE 102 can be, but is not limited to, a mobile phone, a smartphone, tablet, a phablet, a personal digital assistant (PDA), a laptop, a computer, a wearable computing device, a vehicle infotainment device, an Internet of Things (IoT) device, a medical equipment or any other processing devices connected to wireless modems or with radio frequency (RF) processing capabilities. Further, the one or more SIMs supported by the UE 102 may be operated by different service providers/operators. The UE 102 may comprise of one or more physical SIMs and/or one or more virtual SIMs.

The UE 102 can be connected to at least one base station (104a-104n) over an air interface. The base stations (104a-104n) can serve the cells of different Radio Access Technologies (RATs). Examples of the RATs can be, but is not limited to, a Fifth Generation (5G), a Long Term Evolution (LTE), an LTE-Advanced, a $3^{rd}$ Generation Partnership Project (3GPP), a Wideband Code Division Multiple Access (WCDMA) system, a High Speed Access Data (HSPA), a Global System for Mobile Communications/Enhanced Data rate for GSM Evolution (GSM/EDEGE), a Worldwide Interoperability for Microwave Access (WiMax), an Ultra Mobile Broadband (UMB), Wi-Fi and so on. The one or more SIMs of the UE 104 can support the different RATs/subscriptions.

In accordance with ETSI based MEC, at least one edge server (106a-106n) can be placed in proximity to any of the base stations 104a-104n in communication with the UE 102 for low latency communications and application content offloading. The edge servers 106a-106n can provide computing resources, storage capacity, connectivity and access to information about the RATs. The edge server 106a-106n can support various applications (such as, but not limited to, a video streaming related application, a security racking application, an IoT related application, an Augmented Reality (AR) related application and so on) and content (such as files, videos, audio and so on) which can be offloaded to the nearby UE 102. Thus, improving the delivery of the content and the applications to the user.

The communication system 100 may also include a cloud server 116 supporting multiple services (server instances of services) as illustrated in FIG. 1B. Further, some of the services supported by the cloud server 116 may be supported by the edge server 106a-106n.

Further, the UE 102 includes a memory 108, an enablement module/enablement layer module 110, a communication interface module 112 and a display module 114. The UE 102 can also be connected to at least one of external server(s) and application servers by using at least one of the Internet, a wired network (a Local Area Network (LAN), Ethernet and so on), a wireless network (a Wi-Fi network, a cellular network, a Wi-Fi Hotspot, Bluetooth, Zigbee and so on) or the like to download applications for services that can be supported by the UE 102. Examples of the applications referred herein can be, but is not limited to, a call related application, an Over-the Top-(OTT) application, a streaming application, a file downloading related application, an IoT related application, an Augmented Reality (AR) related application and so on. Examples of the services referred herein can be, but is not limited to, a streaming service (streaming of multimedia data such as audio, video, text and so on), a call related service, a file download service, a carousel service (combining file download service and streaming service), a television (TV) service, a media on demand service, or the like. In addition, the UE 102 can be connected to local database/memory 108 and external databases to provide the content (such as files, data, videos, audio and so on) to the user.

The enablement module 110 can comprise at least one of a single processor, a plurality of processors, multiple homogenous cores, multiple heterogeneous cores, multiple Central Processing Unit (CPUs) of different kinds and so on. The enablement module 110 operates by supporting functions of an enablement layer. The enablement layer works in conjunction with at least one of the edge server and application server to provide the content (video, audio, files and so on) and the applications to the user.

In an embodiment, the enablement module 110 can be configured to provide recommendations for completing service(s) requested by the user at a particular location. The recommendations can be at least one of information about availability of an edge server, an application, a SIM, a network slice of the SIM, a RAT/subscription and so on for the requested service. The network slice referred herein may indicate bandwidth, network resources or the like. The enablement module 110 provides the recommendations based on network parameters such as, but not limited to, a Round Trip Time taken between the UE 102 and the application server, an End-to-End (E2E) delay, a network rating and so on. Thus, best possible recommendations can be provided to the user for completing the service that can improve user experience in terms of throughput, latency and cost effects. In another embodiment, based on user priorities set (includes a cost effective factor, a performance factor, a best effort factor and so on), the enablement module 110 can use the determined recommendations to complete the service.

In another embodiment, if an edge server provider (of the edge server (106a-106n)) does not follow the ETSI standards, then the cloud server 116 (as illustrated in FIG. 1B) can also provide recommendations to the user for completing the service(s) at the particular location. The cloud server 116 continuously receives parameters such as, but not limited to, an operator network, availability of an edge server, network slice characteristics, a RTT, signal strength, a geo-location and so on from the enablement module 110 of the UE 102. The cloud server 116 analyzes the received parameters using the machine learning model and determines the at least one of the availability of the edge server, the application server availability, the RAT to use for the application and so on for completing the service requested by the user. The cloud server 116 provides the recommendations to the enablement module 110 in response to a query received from the enablement module 110.

In an embodiment, if the edge server provider follow the ETSI standards, then the UE 102 may determine the available services running on the edge server (106a-106n) using a well defined Application Programming Interface (API) interface.

The display module 114 can be configured to display the recommendations determined by the enablement module 110 on a display screen of the UE 102.

The communication interface module 112 can be configured to establish a connection between the UE 102 and at least one of the application server, the edge server and so on. The communication interface module 112 can operate in accordance with functions of a connectivity layer.

The memory 108 can comprise the applications, information about the recommended applications, information about the network resources, the network parameters and so on. The memory 108 may include one or more computer-readable storage media. The memory 108 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 108 may, in some examples, be considered as a non-transitory storage medium. The term "non-transitory" may indicate that the storage medium is not embodied in a carrier wave or a propagated signal. However, the term "non-transitory" should not be interpreted to mean that the memory 108 is non-movable. In some examples, the memory 108 can be configured to store larger amounts of information than the memory. In certain examples, a non-transitory storage medium may store data that can, over time, change (e.g., in Random Access Memory (RAM) or cache).

FIGS. 1A and 1B show units of the communication system 100, but it is to be understood that other embodiments are not limited thereon. In other embodiments, the communication system 100 may include less or more number of units. Further, the labels or names of the units are used only for illustrative purpose and does not limit the scope of the embodiments herein. One or more units can be combined together to perform same or substantially similar function in the communication system 100.

Figure 2:
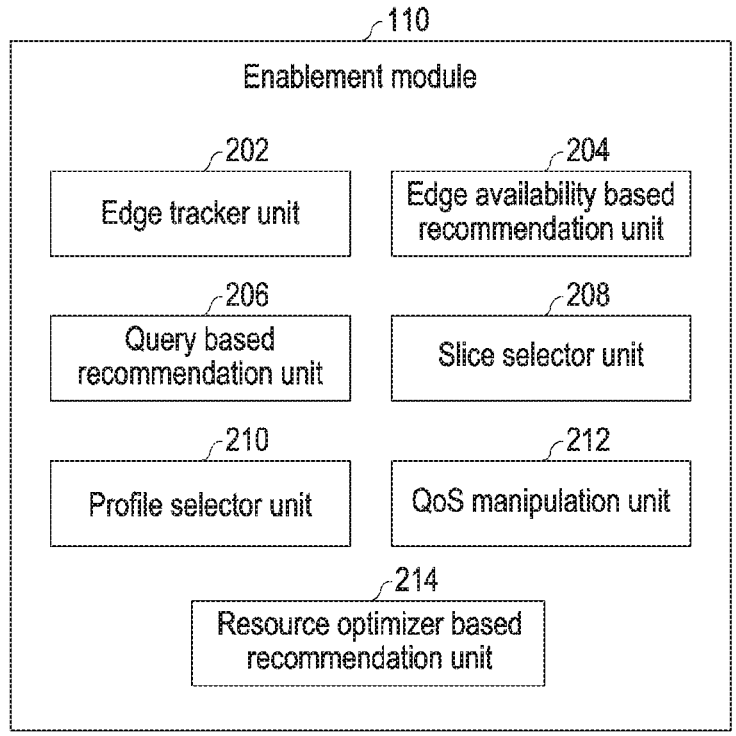
FIG. 2 is an example block diagram illustrating various units of an enablement module for providing recommendations for completing service(s) on a User Equipment (UE), according to embodiments as disclosed herein.

FIG. 2 is an example block diagram illustrating various units of the enablement module 110 for providing the recommendations for completing the service(s) by the UE 102, according to embodiments as disclosed herein. The enablement module 110 includes an edge tracker unit 202, an edge availability based recommendation unit 204, a query based recommendation unit 206, a network slice selector unit 208, a profile selector unit 210, a Quality of Service (QoS) manipulation unit 212 and a resource optimizer based recommendation unit 214.

The edge tracker unit 202 can be configured to determine the availability of the edge server (106a-106n) for the UE 102 during a boot up operation (which can comprise of the UE 102 starting up, the UE 102 exiting flight mode, and so on) or on determining a change in the cell location. In an embodiment, the edge tracker unit 202 determines the availability of the edge server using the ETSI MEC standard. The edge tracker unit 202 sends an 'registration request' to a 5G core network for checking the availability of the edge server (106a-106n). In response to the 'registration request', the edge tracker unit 202 receives a 'registration accept' response from the 5G core network indicating the availability of the edge server (106a-106n). On determining that the edge server (106a-106n) is available, the edge tracker unit 202 further validates the availability of the edge server (106a-106n) by checking system properties of the UE 102.

On determining that the edge server (106a-106n) is available, the edge tracker unit 202 instructs the display module 114 to update a status bar displayed on the screen of the UE 102. The updated status bar may indicate the user about the availability of the edge server (106a-106n). In an example herein, the display module 114 may display a letter/icon 'M' on the status bar for indicating the availability of the edge server (106a-106n). Embodiments herein are explained considering display of the icon 'M' on the status bar for the indication of the availability of the edge server, but any suitable display indications may be considered.

On determining that the edge server (106a-106n) is available, the edge tracker unit 202 queries the edge service provider for the availability of one or more applications by sending a query command to the edge server (106a-106n). In an example herein, the edge tracker unit 202 queries the edge service provider for the availability of one or more applications by sending a "GET app list" command to the edge server (106a-106n). In response to the query command, the edge tracker unit 202 obtains a response from the edge service provider, wherein the response provides information about the availability of the one or more application server instances at the edge server (106a-106n). In an example herein, the response received from the edge server (106a-106n) can be in a Hypertext Transfer Protocol (HTTP) Response format. Further, the edge tracker unit 202 instructs the display module 114 to provide notifications for the one or more applications resident on the UE 102 based on the availability of the edge server (102a-102n) for the one or more applications.

On receiving the instructions from the edge tracker unit 202, the display module 114 performs User Interface (UI)

based actions. The UI based actions can be, but not limited to providing badge notifications, creating a folder and so on. In an embodiment, on receiving the instructions from the edge tracker unit 202, the display module 114 creates the folder and inserts the one or more applications available at the edge server (106a-106n) in the created folder. In an example herein, on receiving the instructions from the edge tracker unit 202, the display module 114 creates a MEC folder and inserts the one or more applications available at the edge server (106a-106n) in the MEC folder.

In another embodiment, on receiving the instructions from the edge tracker unit 202, the display module 114 assigns the badge notifications for the one or more applications available at the edge server (106a-106n). The badge notifications can include one or more letters indicating the availability of the edge server (106a-106n) for the one or more applications. In an example herein, assigning the badge notifications may include assigning a letter 'M' for the one or more applications available at the edge server (106a-106n). Embodiments herein are explained considering assigning the letter 'M' for the one or applications for the indication of the availability of the edge server, but any other suitable display indications may be considered.

The edge tracker unit 202 can be further configured to determine availability of a local storage adapted with the edge server (106a-106n) to upload the contents. The local storage can be, but is not limited to, a file server, a Network-Attached Storage (NAS), a local cloud and so on. The edge tracker unit 202 determines the availability of the local storage adapted with the edge server (106a-106n) while retrieving the list of available applications at the edge server (106a-106n). The edge tracker unit 202 determines the availability of the local storage adopted with the edge server (106a-106n) in accordance with the ETSI standard.

On determining the availability of local storage adopted with the edge server (106a-106n), the edge tracker unit 202 can delegate the task of downloading the content to the edge server (106a-106n) and can download the content later, on determining that the user is moving. In an example herein, the content (like files) stored in the local storage can be viewed using a file explorer mounted using a Web Distributed Authoring and Versioning protocol (WebDAV protocol). The content stored in the local storage can also be streamed from the edge server (106a-106n) when the user performs a gesture (such as a click, tap, swipe, or the like) on the content. Thereby, usage of the device storage can be reduced.

The edge availability based recommendation unit 204 can be configured to recommend one or more applications for completing the service(s) requested by the user. The edge availability based recommendation unit 204 can also recommend the application for the currently using a RAT. The application can be recommended for the service based on at least one of the Round Trip Time (RTT) and the End-to-End (E2E) delay.

On receiving the request from the user for a first service at a particular location, the edge availability based recommendation unit 204 recommends the application(s) for completing the first service based on the RTT. The first service can be a throughput based service without including any call related service. Examples of the first service can be, but not limited to, a streaming service, a file downloading service, a carousel service and so on.

The edge availability based recommendation unit 204 determines the RTT between the UE 102 and the application servers for one or more applications supporting the requested service. The application servers can be the servers supporting the one or more applications for the requested first service. The application server herein can be residing in the edge server (106a-106n). In an embodiment, the RTT can be determined using any suitable application, compatible with an Operating System (OS) of the UE 102. In another embodiment, the RTT can be determined based on a time difference measured for a packet to reach the application servers from the UE 102 and vice versa. It should be noted that embodiments herein are not limited to the above methods for measuring the RTT and any other techniques/methods can be used for measuring the RTT without otherwise deterring the intended functions of the features of the embodiments as can be deduced from this description.

The edge availability based recommendation unit 204 determines the RTT for the one or more applications based on each cell of a plurality of cells associated with the base station (104a-104n) which is in communication with the UE 102. The edge availability based recommendation unit 204 averages the calculated RTT for the one or more applications. The edge availability based recommendation unit 204 selects the application from the one or more applications with the lowest RTT value for completing the requested first service. The averaged RTT value can vary depends on parameters such as, but not limited to, availability of the edge service, network slice characteristics, signal strength at a particular geo-location, current network load and so on. Further, the application with the lowest RTT value indicates that the application is available at the edge server (106a-106n). The edge server (106a-106n) can be deployed near to the base station (104a-104n), which is in communication with the UE 102. Thus, the application available at the edge server may be the best possible application for completing the service at the particular location, thereby achieving the low latency communication.

For example, consider a scenario, wherein the user requests for a video streaming service at the particular location and an application (app) A, an app B and an app C are the determined applications supporting the video streaming service. The edge availability based recommendation unit 204 determines the RTT for the app A, the app B and the app C based on each cell of the base station (104a-104n) and averages the determined RTT for the app A, the app B and the app C. The edge availability based recommendation unit 204 determines that the app A is having the lowest RTT value. Further, based on the RTT value, the edge availability based recommendation unit 204 identifies that the app A can be available at the edge server (106a-106n). Thus, the edge availability based recommendation unit 204 suggests the app A for completing the video streaming service at the particular location.

Further, on receiving the request from the second service, the edge availability based recommendation unit 204 recommends the application for the second service based on the E2E delay. Examples of the second service can be the call related service, conference related service or the like. The edge availability based recommendation unit 204 determines the E2E delay for the one or more applications supporting the second service. The E2E delay (also called the mouth-to-ear delay) determined for the one or more applications can be the latency between the MO (Mobile Originator) 102 and the MT (Mobile Terminator) (104a-104n). The E2E delay can be the delay referring to a time taken for a packet to be transmitted across a Radio Access Network (RAN), from the MO 102 to the MT (104a-104n). The edge availability based recommendation unit 204 determines the E2E delay based on each cell of the plurality of cells associated with the base station (104a-104n) which is in further communication with the UE 102. The edge availability based recommendation unit 204 averages the calculated E2E delay for the one or more applications. The edge availability based recommendation unit 204 selects the application from the one or more applications with the lowest E2E value for completing the requested second service. The averaged E2E delay value can vary depends on parameters such as, but not limited to, availability of the edge service, network slice characteristics, signal strength at particular geo-location, MT's location, current network load and so on. Further, the application with the lowest E2E delay value indicates that the application is available at the edge server (106a-106n) which is deployed near to the base station (104a-104n) which is in communication with the UE 102. Thus, the application available at the edge server (106a-106n) may be recommended as the best possible application for completing the service at the particular location, thereby achieving low latency communication.

For example, consider an example scenario, wherein the user wants to call another user and an app C1, an app C2 and an app C3 are the determined applications supporting the call related services. The edge availability based recommendation unit 204 determines the E2E delay for the app C1, the app C2 and the app C3 and averages the determined E2E delay for the app C1, the app C2 and the app C3. The edge availability based recommendation unit 204 determines that the E2E delay is low for the app C2. Since the app C2 is having the lowest E2E delay, the app C2 can be available at the edge server (106a-106n). Thus, the edge tracker unit 202 suggests the app C2 to the user who can use the app C2 for calling another user.

The edge availability based recommendation unit 204 instructs the display module 114 to display the recommended application (based on at least one of the RTT and the E2E delay) to the user for completing the requested service. In another embodiment, based on the user priorities set, the edge availability recommendation unit 204 may switch to the recommended application automatically for completing the service.

The query based recommendation unit 206 can be configured to query the cloud server 116 and recommend the application for completing the service at the particular location. On receiving the request for completing the service (includes at least one of the first service and the second service) from the user, the query based recommendation unit 206 sends the request to the cloud server 116. The request can include at least one of a cell identifier, an operator network identifier, a geo-location and so on. The query can be for the availability of the edge server and the application(s) supporting the requested service. In response to the request, the query based recommendation unit 206 receives the recommendations from the cloud server 116 for completing the requested service at the particular location. The recommendations can be at least one of the availability of the edge server, the application for completing the requested service, the RAT to use for the application and so on. The query based recommendation unit 206 instructs the display module 114 to display the recommendations to the user for completing the requested service.

For example, consider an example scenario, wherein the user wants to watch a movie and an app A, an app B and an app C are the available applications on the UE 102 supporting the video/movie streaming related service. The query based recommendation unit 206 queries the edge service provider and recommends the app C for watching the movie based on the availability of the edge server (106a-106n) for the app C.

The slice selector unit/network slice selector unit 208 can be configured to select the network slice of a SIM present in the UE for the completing the requested service at the particular location. The network slice selector unit 208 can select the network slice of the SIM based on factors such as, an availability of a network slice, characteristics of the available network slice and so on. The characteristics of the network slice can be, but not limited to, throughput, latency or the like. In an embodiment, the network slice selector unit 208 provides an auto mode and a user mode for the selection of the at least one of the SIM and the network slice of the SIM for the requested service.

In the auto mode, the network slice selector unit 208 selects the network slice in accordance with a Single Slice Selection Assistance Information (S-NSSAI) of the 3GPP standard. The network slice can be selected based on behavior of the network slice in terms of features and services. In the auto mode, the network slice selector unit 208 can also select the network slice based on pre-configured user priorities. The user priorities can be based on at least one of a cost effectiveness factor, a performance factor, a best effort factor and so on.

In the user mode, the user may be provided with options to select at least one of the network slice, the SIM and so on. Each option may include details about the availability of the edge server (106a-106n) for the selected particular service. Further, the network slice selector unit 208 can obtain information for the user selected network slice by initiating a Protocol Data Unit (PDU) session establishment with an Access and Mobility Management Function (AMF) instance that is serving the UE 102. The information obtained for the network slice can be at least one of a Data Network Name (DNN), a Session and Service Continuity (SSC) mode, a session type and so on. In addition, the network slice selector unit 208 can provide an interface to the user for requesting a new network slice on demand for the requested service.

The profile selector unit 210 can be configured to track the RATs associated with the base station in communication with the UE 102 and the associated subscriptions with the charging details. The subscriptions and the charging details can be tracked based on profiles downloaded to the SIMs of the UE 102. Further, the profile selector unit 210 can provide an interface to the user for buying/editing subscriptions and downloading corresponding profiles of the subscriptions to the SIMs. The profile selector unit 210 uses 5G characteristics such as, but not limited to, a resource type, a priority level, a Packet Delay Budget (PDB), a Packet Error Rate (PER), an averaging window, a maximum data burst volume and so on and recommends the RAT/subscription for completing the service requested by the user.

The QoS manipulator unit 212 can be configured to prioritize traffic of the application(s) by manipulating the QoS for different features of the application(s). The QoS manipulator 212 prioritizes the traffic of the application(s) which are not available at the edge server (106a-106n). In order to prioritize the traffic of a particular application, the QoS manipulator 212 provides an 5G QoS identifiers (5QI) for the application and further sends the 5QI values to the RAT for providing better bandwidth and latency to such applications.

The resource optimizer based recommendation unit 214 can be configured to provide recommendations for completing the services at the particular location based on the network rating. The recommendations can be at least one of the application, the RAT, the SIM, and so on for completing the services. When the UE 102 supports multiple SIMs, the resource optimizer based recommendation unit 214 determines the network rating for each of the SIMs.

The resource optimizer based recommendation unit 214 communicates with the edge tracker unit 202, the edge availability based recommending unit 204, the network slice selector unit 208, the profile selector unit 210 and the QoS manipulator unit 212 and obtains information about the availability of the edge server (106a-106n), the RTT and the E2E delay, the availability/selection of the network slice/SIM, the RAT and the associated subscriptions and the charging details and the QoS manipulated for the application respectively. Using such information, the resource optimizer based recommendation unit 214 determines the network rating. The network rating can be calculated for at least one of the subscription/RAT, the application, the SIM and so on. In addition, the resource optimizer based recommendation unit 214. updates the local database corresponding to the one or more applications with the received information such as, but not limited to, the RAT/subscription, the availability of the edge server and the network slice, corresponding QoS, the charging details for the subscription/the RAT, the RTT, the E2E delay and so on. Thus, the resource optimizer based recommendation unit 214 may provide the best possible recommendations based on at least one of the network rating and using the information of the updated database.

Based on the network rating calculated for the one or more applications supporting the requested service, the resource optimizer based recommendation unit 214 recommends the application for the requested service. Based on the network rating calculated for the one or more RATs associated with the UE 102, the resource optimizer based recommendation unit 214 recommends the RAT that can be used for the application recommended for the requested service. Further, based on at least one of the characteristics of the available network slices for the SIM and the network rating determined for the one or more SIMs, the resource optimizer based recommendation unit 214 recommends the SIM that can be used for the application recommended for the requested service. In addition, based on at least one of the characteristics of the available network slices for the SIM, the resource optimizer based recommendation unit 214 recommends the network slice for the SIM.

Further, the network rating can be represented as a function of the parameters such as, but not limited to, signal strength, network load information, network slice availability, edge availability, RTT and so on. The network rating can be represented as:

$$NWR = f2(S, E, RTT^*, C, X)$$

wherein, f2 indicates a functional value, 'S' represents the availability of the network slice/network slice rating, 'E' represents the availability of the edge service/edge rating of service, 'C' represents a rating based on the charging details, and 'X' represents a function of the signal strength and the network load. 'X' can be represented as:

$$X = f1(SS, NL)$$

wherein, 'f1' represents a functional value, 'SS' represents the signal strength and 'NL' represents the network load. If the signal strength and network rating are good, then 'X' rating can be better. Further, the availability of high throughput and low latency network slice may increase the network rating than the network slice having only one of them or none of them. In addition, the RTT can be considered for calculating the network rating only when the network slice and the edge server (106a-106n) are not available.

Further, the network rating can be calculated as $$NWR = W1^*SS + W2^*C + W3^*NL + W4^*E + W5^*S$$

wherein, W1-W5 represents a weightage provided based on the availability of the edge server (106a-106n) and the network slice, signal strength thresholds, charging thresholds, RTT thresholds, the network load and so on. Based on the network rating, the resource optimizer based recommendation unit 214 can provide the recommendations for completing the requested service. The resource optimizer based recommendation unit 214 instructs the display module 114 to display the recommendations to the user for completing the service at the particular location. For example, consider a scenario, where the user wants to watch a live football match and an app A and an app B can be determined as the applications supporting the streaming of the live football match. The resource optimizer based recommendation unit 214 determines the network rating for the app A and the app B and identifies that the network rating for the app B is greater than the app A. Thus, the resource optimizer based recommendation unit 214 recommends the app B to the user for watching the live football match.

Further, irrespective of the network rating, the resource optimizer based recommendation unit 214 recommends at least one of the application and a SIM for completing the service based on factors such as, but not limited to, a performance factor, a cost effectiveness factor, and so on.

In case of providing the recommendations based on the performance factor, the resource optimizer based recommendation unit 214 provides recommendations for completing the service irrespective of the charging details. The recommendations can be provided by considering the availability of the edge server and the network slice, the signal strength and the network load. In an example herein, for autonomous driving applications, the resource optimizer based recommendation unit 214 can provide the recommendations based on the performance factor. In case of providing the recommendations based on the cost effectiveness factor, the resource optimizer based recommendation unit 208 considers the charging parameter and provides the recommendations irrespective of other parameters. In an example herein, when the user wants any service without any cost, the resource optimizer based recommendation unit 214 can provide the recommendations based on the cost effectiveness factor. In an embodiment, the resource optimizer based recommendation unit 214 may instruct the display module 114 to provide an interface to the user and receives information from the user regarding a selection of at least one of the performance factor and the cost effectiveness factor for providing the recommendations.

FIG. 2 shows units of the enablement module 110, but it is to be understood that other embodiments are not limited thereon. In other embodiments, the enablement module 110 may include less or more number of units. Further, the labels or names of the units are used only for illustrative purpose and does not limit the scope of the embodiments herein. One or more units can be combined together to perform same or substantially similar function in the enablement module 110.

Figure 3:
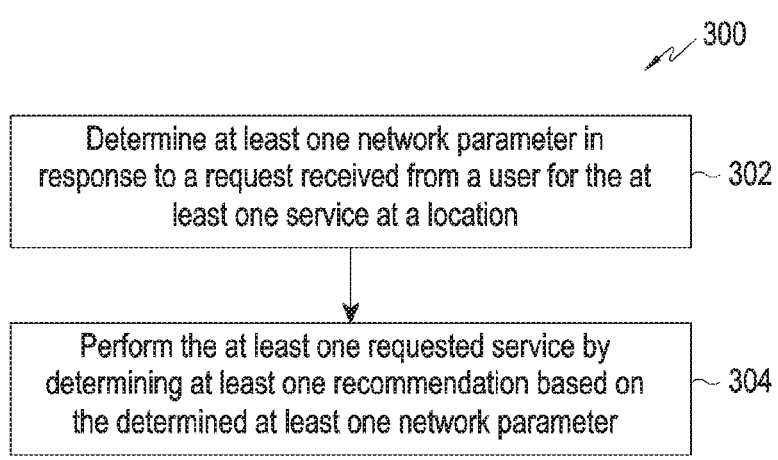
FIG. 3 is a flow diagram illustrating a method for providing recommendations for completing service(s) on a UE at a particular location, according to embodiments as disclosed herein.

FIG. 3 is a flow diagram 300 illustrating a method for providing the recommendations for completing the service(s) on the UE at the particular location, according to embodiments as disclosed herein.

At step 302, the method includes determining, by the enablement module 110, the network parameters in response to a request received from the user for the at least one service at the location. The network parameters can be, but not limited to, at least one of the availability of the edge server, the RTT and the E2E delay the availability of the network slices, the characteristics of the available network slices, the network load, the charging details, the signal strength and so on.

At step 304, the method includes performing, by the enablement module 110, the services by determining the recommendations based on the determined network parameters. The recommendations can be at least one of the application, the SIM, the network slice of the SIM, the RAT/the subscription and so on for performing the requested service. In addition, the recommendation can include the application for the currently used RAT. In an embodiment, based on the user priority set, the enablement module 110 may use the recommendations automatically for completing the requested service(s). In another embodiment, the enablement module 110 may provide the determined recommendations to the user for performing the requested service(s).

The various actions, acts, blocks, steps, or the like in the method and the flow diagram 300 may be performed in the order presented, in a different order or simultaneously. Further, in some embodiments, some of the actions, acts, blocks, steps, or the like may be omitted, added, modified, skipped, or the like without departing from the scope of the disclosure.

Figure 4A:
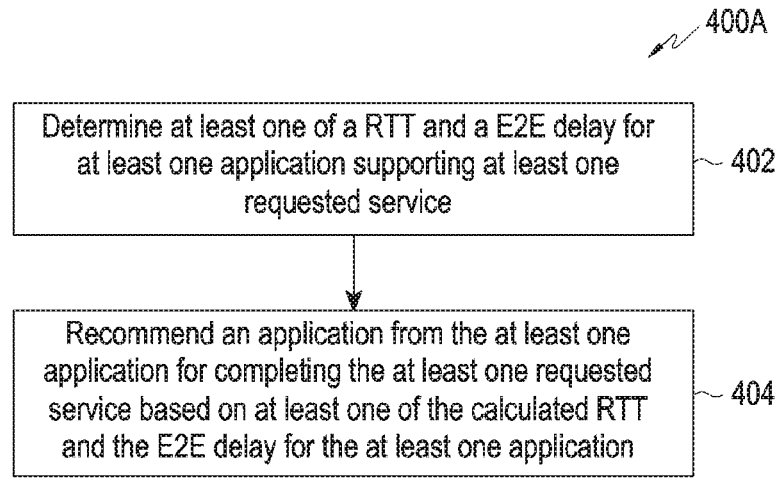
FIG. 4A is a flow diagram illustrating a method for recommending an application for completing a particular service on a UE at a particular location based on at least one of a RTT and an E2E delay, according to embodiments as disclosed herein.

FIG. 4A is a flow diagram 400A illustrating a method for recommending the application for completing the particular service on the UE at the particular location based on at least one of the RTT and the E2E delay, according to embodiments as disclosed herein.

At step 402, the method includes calculating, by the enablement module 110, at least one of the RTT and the E2E delay for the one or more applications supporting the service requested by the user. The requested service can include at least one of the first service (such as the streaming service, the file downloading service, the carousel service and so on) and the second service (such as the call related service). The enablement module 110 calculates the RTT for the one or more applications supporting the first service and the E2E delay for the one or more applications supporting the second service. The enablement module 110 calculates the at least one of the RTT and the E2E delay based on each cell of the plurality of cells of the base station (104a-104n) which is in communication with the UE 102. Further, the enablement module 110 averages the at least one of the RTT and the E2E delay for the one or more applications supporting the requested service.

At step 404, the method includes recommending, by the enablement module 110, the application from the one or more applications for completing the requested service based on the calculated at least one of the RTT and the E2E delay. The enablement module 110 selects the application with the at least one of the lowest RTT value and the lowest E2E delay from the one or more applications. The enablement module 110 recommends the selected application as the recommended application for completing the requested service.

The various actions, acts, blocks, steps, or the like in the method and the flow diagram 400A may be performed in the order presented, in a different order or simultaneously. Further, in some embodiments, some of the actions, acts, blocks, steps, or the like may be omitted, added, modified, skipped, or the like without departing from the scope of the disclosure.

Figure 4B:
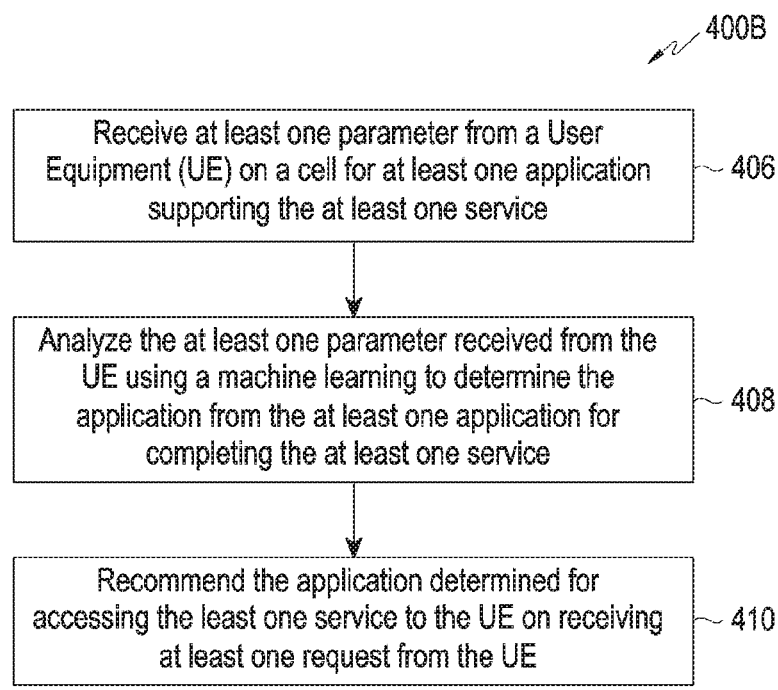
FIG. 4B is a flow diagram illustrating a method for providing recommendations for service(s) by querying a cloud server, according to embodiments as disclosed herein.

FIG. 4B is a flow diagram 400B illustrating a method for providing the recommendations for the service(s) by querying the service deployed on the cloud 116, according to embodiments as disclosed herein.

At step 406, the method includes receiving, by the cloud server 116 (service deployed on the cloud server 116), the parameters from the enablement module 110 of the UE 102 on the cell for the one or more applications supporting the services. The parameters can be, but not limited to, an operator network, availability of an edge server, network slice characteristics, a RTT, signal strength, a geo-location and so on.

At step 408, the method includes analyzing, by the cloud server 116, the parameters received from the enablement module 110 using the machine learning model to determine the application from the one or more applications for the service(s). At step 410, the method includes recommend, by the cloud server 116, the determined application that can be used for completing the service on the UE 102 on receiving the request from the enablement module 110. The request can include at least one of a cell id, a tower id, a geo-location and so on. Thus, the enablement module 110 can query the cloud server 116 to recommend the application for completing the requested service at the particular location.

The various actions, acts, blocks, steps, or the like in the method and the flow diagram 400B may be performed in the order presented, in a different order or simultaneously. Further, in some embodiments, some of the actions, acts, blocks, steps, or the like may be omitted, added, modified, skipped, or the like without departing from the scope of the disclosure.

Figure 4C:
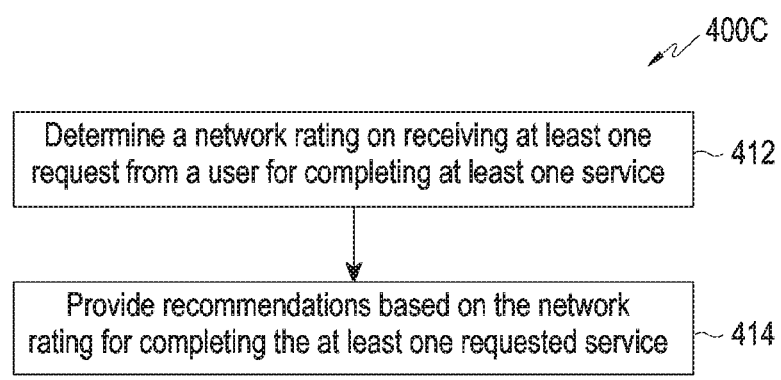
FIG. 4C is a flow diagram illustrating a method for providing recommendations for a requested service based on a network rating, according to embodiments as disclosed herein.

FIG. 4C is a flow diagram 400C illustrating a method for providing the recommendations for the requested service based on the network rating, according to embodiments as disclosed herein.

At step 412, the method includes determining, by the enablement module 110, the network rating on receiving the request from the user for completing the service(s). The network rating can be calculated for the at least one of the one or more applications supporting the requested service, the one or more RATs associated with the base station (104a-104n), the one or more SIMs and so on. The network rating can be calculated based on the parameters such as, but not limited to, signal strength, network load information, network slice availability, edge availability, RTT and so on. The network rating (NWR) can be calculated as:

$$NWR = W1*SS + W2*C + W3*NL + W4*E + W5*S$$

At step 414, the method includes providing, by the enablement module 110, the recommendations for completing the requested service. The recommendations can be, but not limited to, the application, the SIM, the RAT, the network slice of the SIM and so on.

In an embodiment, the enablement module 110 can recommend the application for the requested service based on the network rating determined for the one or more applications supporting the requested service. In another embodiment, based on the network rating determined for the one or more RATs, the enablement module 110 can suggest the RAT for the application recommended for the requested service. In yet other embodiment, based on the network rating determined for the one or more SIMs, the enablement module 110 can suggest the SIM to use for the application recommended for the requested service. In yet other embodiment, based on at least one of the network slice characteristics and the network rating determined for the one or more SIMs, the enablement module 110 suggests the network slice of the SIM for the application recommended for the requested service.

The various actions, acts, blocks, steps, or the like in the method and the flow diagram 400C may be performed in the order presented, in a different order or simultaneously. Further, in some embodiments, some of the actions, acts, blocks, steps, or the like may be omitted, added, modified, skipped, or the like without departing from the scope of the disclosure.

Figure 5A:
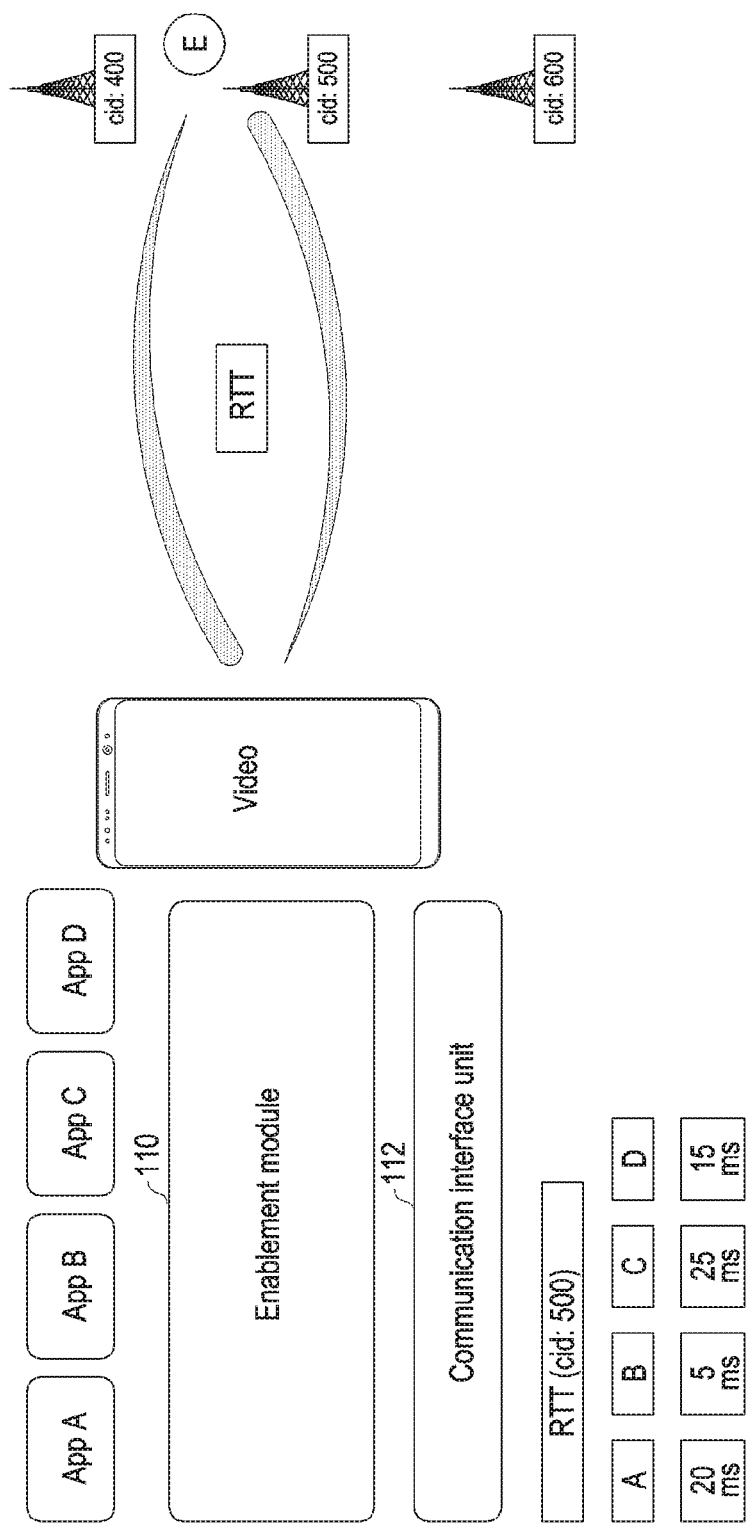
FIGS. 5A, 5B and 5C are example diagrams illustrating recommendation of an application for a requested service based on a RTT, according to embodiments as disclosed herein.
Figure 5B:
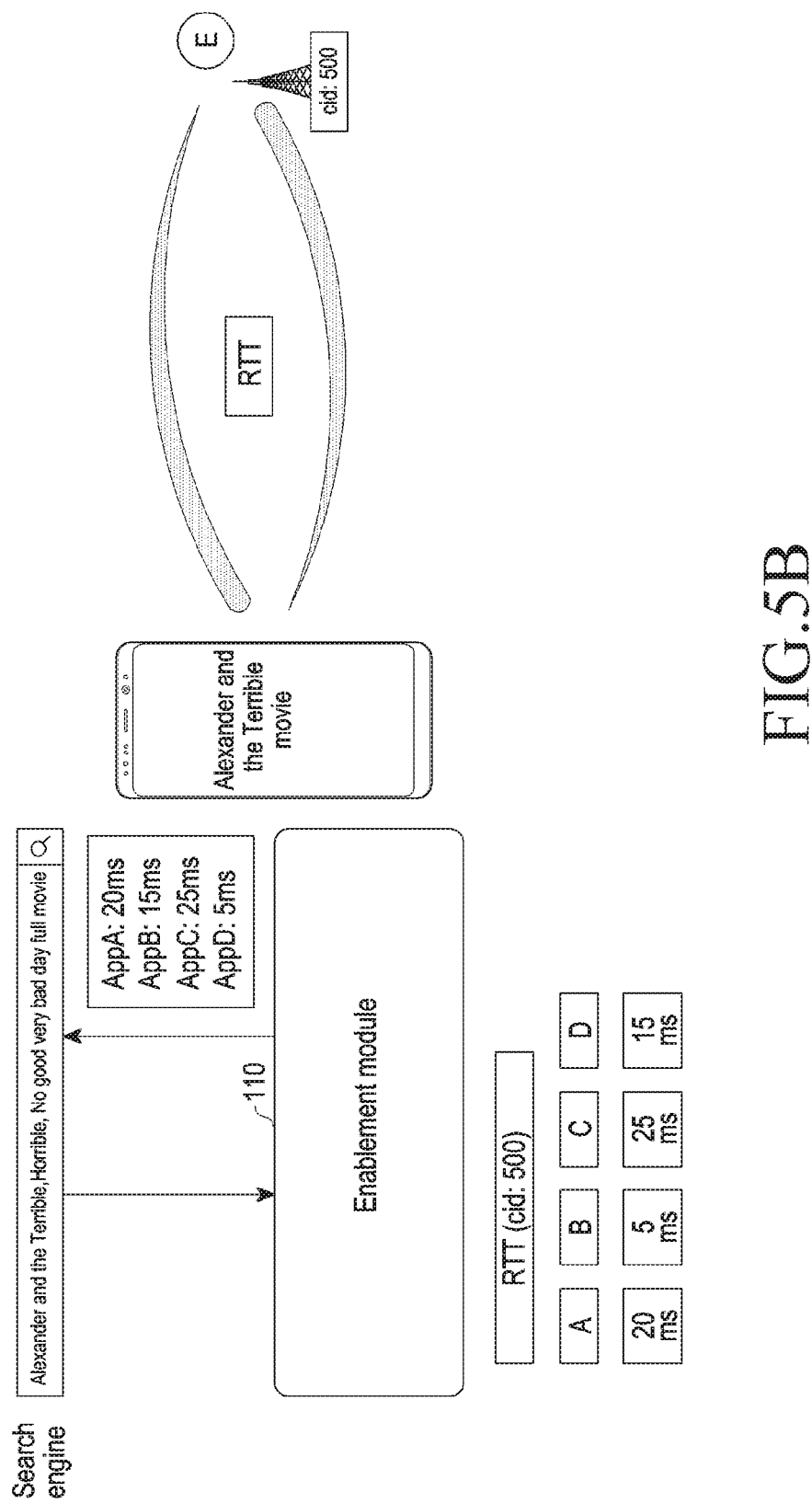
Figure 5C:
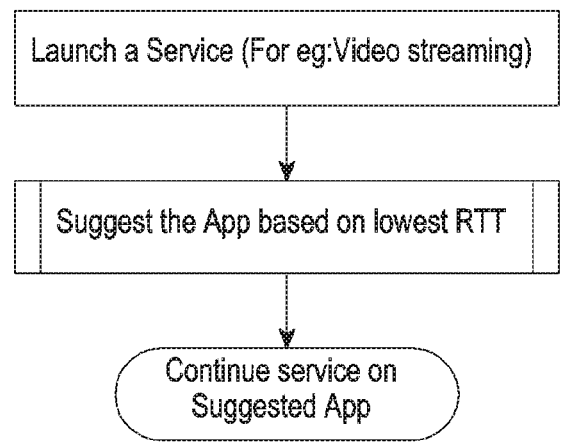

FIGS. 5A, 5B and 5C are example diagrams illustrating recommendation of the application for the requested service based on the RTT, according to embodiments as disclosed herein.

Consider a scenario as illustrated in FIG. 5A, wherein the user wants to watch a video and an app A, an app B, an app C and an app D are the applications supporting the video streaming related service. The enablement module 110 determines the RTT for the app A, the app B, the app C and the app D. The RTT can be calculated based on each cell of the plurality of cells associated with the base station (104a-104n) in communication with the UE 102. In an example herein, the RTT can be calculated based on a cell having a cell identifier (cid) of 400, a cell of cid 500 and a cell of cid 600 (the serving cells) of the base station (104a-104n). Since the edge server (106a-106n) is placed near to the base station (104a-104n) serving the cell of cid 500, the RTT calculated based on the cell of cid 500 can be considered to recommend the application. The RTT calculated for the app A, the app B, the app C and the app D based on the cell of cid 500 may be 20 ms, 16 ms, 25 ms and 15 ms respectively. Thus, the enablement module 110 identifies that the edge server (106a-106n) may be available for the app D. Thus, the enablement module 110 recommends the app D for watching the video, since the app D is having the lowest RTT value. Thus, the low latency communication can be achieved.

Consider an example scenario as illustrated in FIG. 5B, wherein the user searches for a movie for streaming. The enablement module 110 determines that an app A, an app B, an app C and an app D are the applications supporting the video streaming/movie related service. The enablement module 110 calculates the RTT for the applications supporting the video streaming service. In an example herein, the RTT calculated for the app A, the app B, the app C and the app D may be 20 ms, 15 ms, 25 ms and 5 ms respectively. Thus, the enablement module 110 recommends the app D for watching the movie, as the app D is having the lowest RTT value.

As illustrated in FIG. 5C, the user launches a video streaming service. The enablement module 110 determines the application from the one or more applications as having the lowest RTT value. Once the application is determined, the enablement module 110 provides the suggestion for the user to continue the launched service using the determined application (with the lowest RTT value).

Figure 6A:
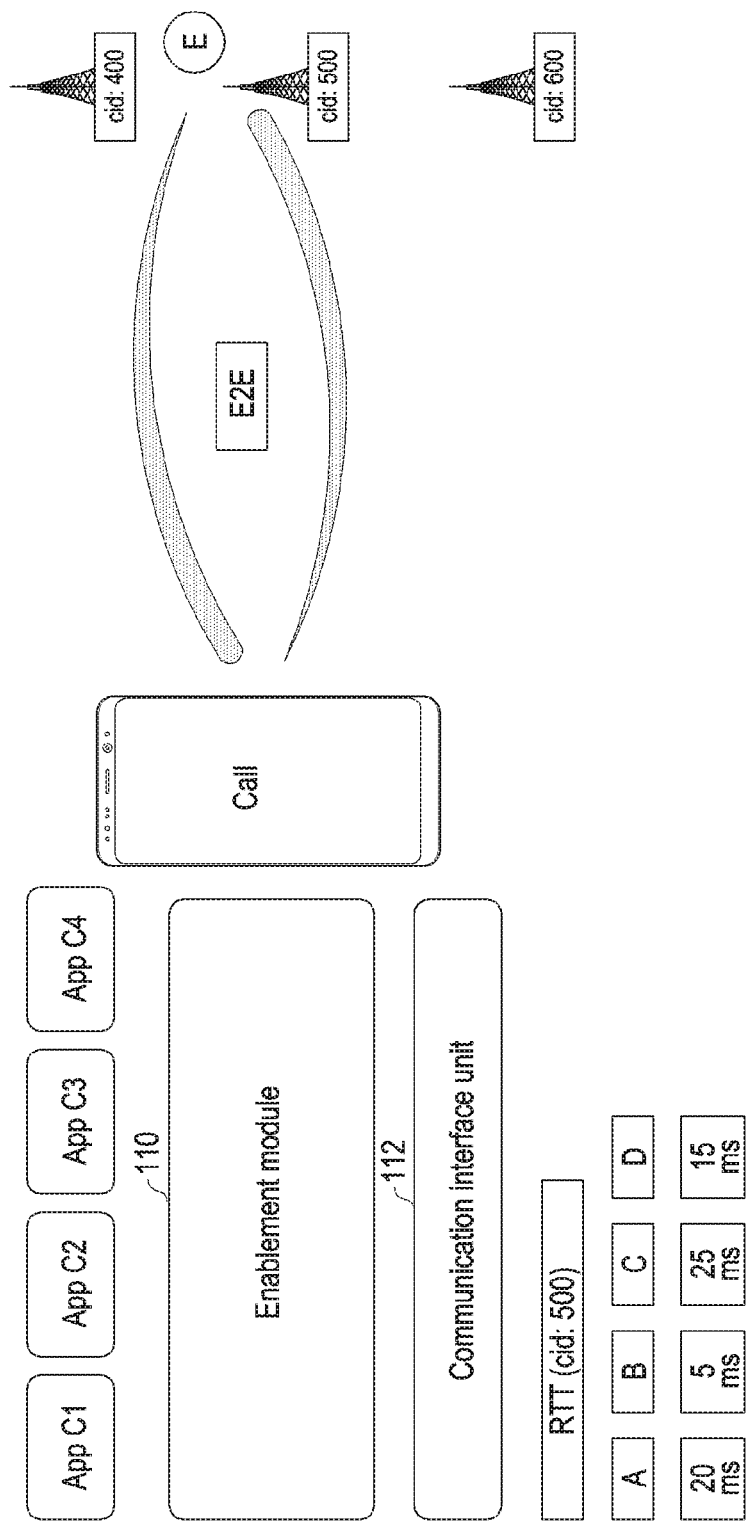
FIGS. 6A and 6B are example diagrams illustrating recommendation of an application for a call related service based on an E2E delay, according to embodiments as disclosed herein.
Figure 6B:
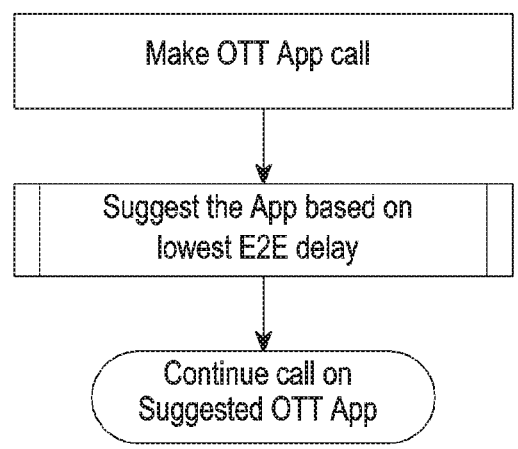

FIGS. 6A and 6B are example diagrams illustrating recommendation of the application for the call related service based on the E2E delay, according to embodiments as disclosed herein.

Consider an example scenario as illustrated in FIG. 6A, wherein the user wants to call another user and an app C1, an app C2, an app C3 and an app C4 are the applications supporting the call related service. On receiving the request from the user for the call related service, the enablement module 110 calculates the E2E delay for the applications C1-C4 based on each cell of the plurality of cells (a cell of cid 400, a cell of cid 500 and a cell of cid 600) of the base station in communication with the UE 102. In an example herein, E2E delay calculated for the app C1, the app C2, the app C3 and the app C4 based on the cell of cid 500 may be 20 ms, 5 ms, 25 ms and 15 ms respectively. The enablement module 110 identifies the availability of the edge server (106a-106n) for the app C2, as the app C2 is having the lowest E2E delay. Thus, the enablement module 110 recommends the app C2 to the user to make the call to another user.

As illustrated in FIG. 6B, the user makes an OTT app call. The enablement module 110 selects the OTT app based on the lowest E2E delay and provides the suggestion to the user to the continue the call on the selected OTT app.

Figure 7:
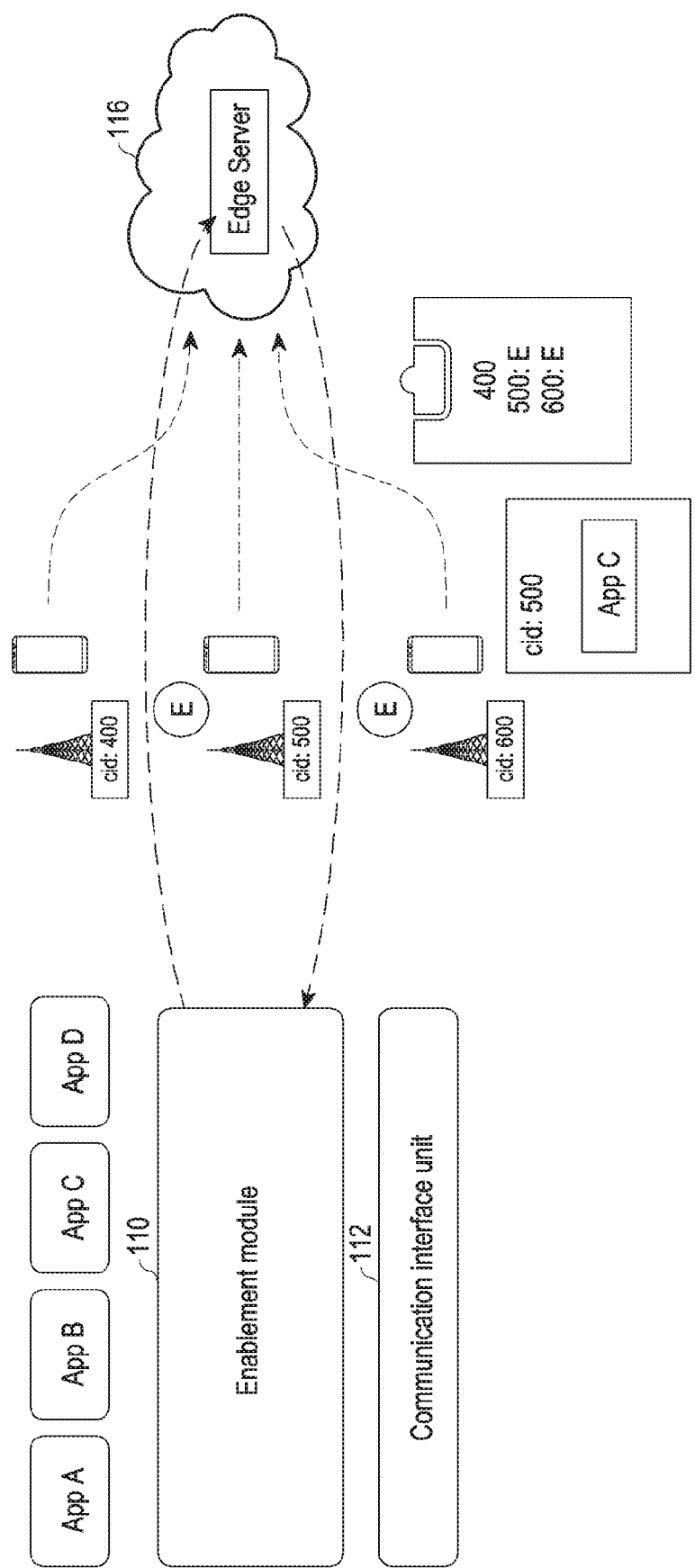
FIG. 7 is an example diagram illustrating recommendation of an application for a particular service by the cloud server, according to embodiments as disclosed herein.

FIG. 7 is an example diagram illustrating recommendation of the application for the particular service by the service) deployed on the cloud server 116, according to embodiments as disclosed herein. Consider an example scenario as illustrated in FIG. 7, wherein the user wants to watch a movie and the applications A-D are available on the UE supporting the movie format/stream. The enablement module 110 of the UE 102 queries the cloud server 116 for suggesting the application to watch the movie. The cloud server 116 determines the application for watching the movie based on the parameters/5G characteristics continuously received from the UE 102 on the at least one cell (which can be cells having cid of 400, 500 and 600) of the base station (104a-104n) in communication with the UE 102. The parameters can be, but not limited to, operator network, edge availability, network slice characteristics, RTT, signal strength, location details and so on. In an example herein, based on the received parameters, the edge server (106a-106n) determines that the edge server is placed near to the base station serving the cell of cid 500. Further, the cloud server 116 determines that the app C is the only application available on the edge server (106a-106n) supporting the movie related service. The service (106a-106n) provides the app C as suggestion in response to the request received from the enablement module 110. Thus, the enablement module 110 recommends the app C to the user as the best possible application to watch the movie.

Figure 8:
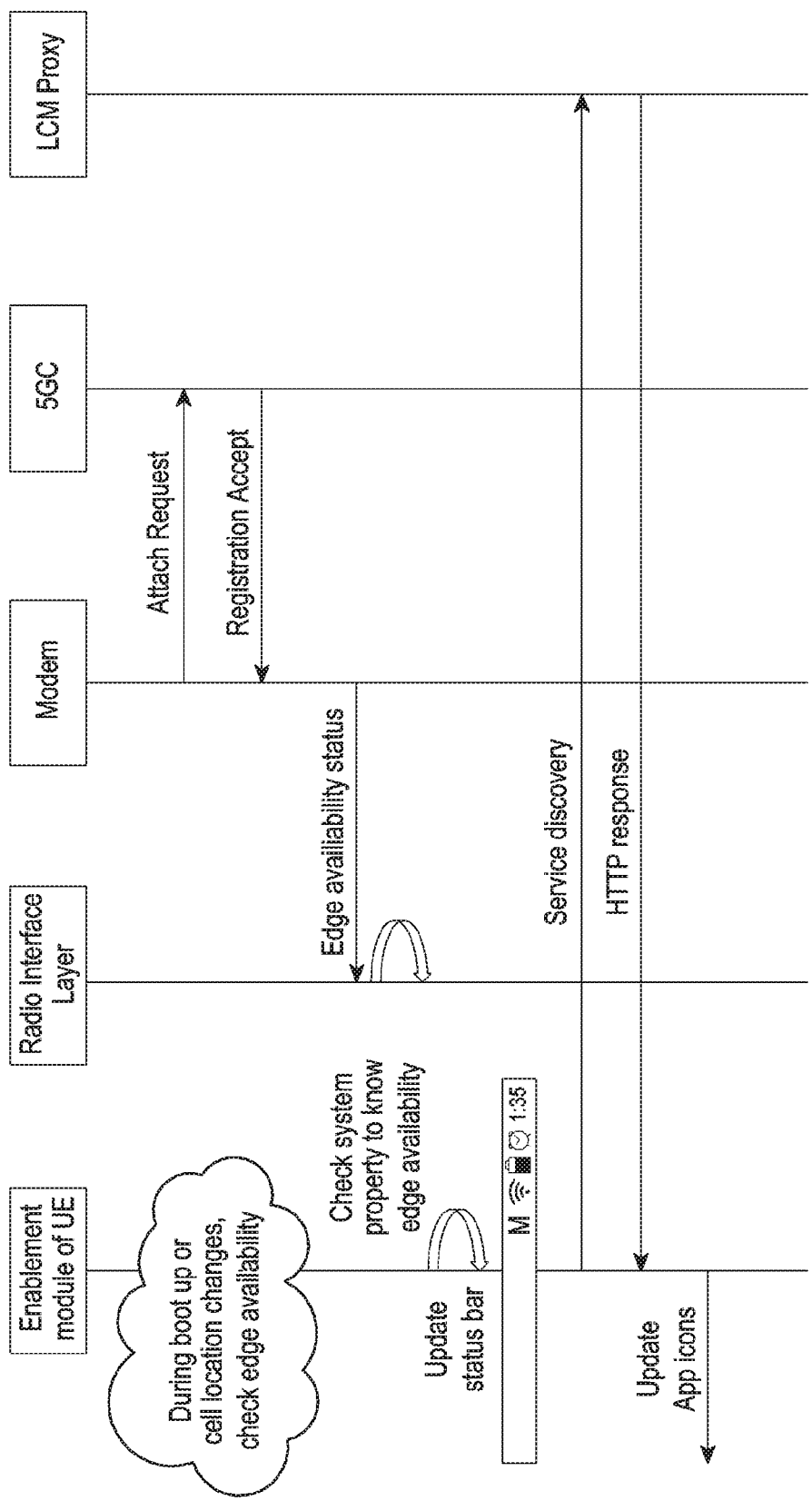
FIG. 8 is an example sequence diagram illustrating determination of availability of an edge server for one or more applications, according to embodiments as disclosed herein.

FIG. 8 is an example sequence diagram illustrating determination of availability of the edge server for the one or more applications, according to embodiments as disclosed herein. As illustrated in FIG. 8, during a boot up operation (which can comprise of the UE 102 starting up, the UE 102 exiting flight mode, and so on) or on determining a change in the cell location, the enablement module 110 of the UE 102 checks the availability of the edge server. Further, the enablement module 110 sends the 'Registration Request' to the 5G core network using a modem to check whether the edge server (106a-106n) is available or not. In response to the 'Registration Request', the 5G core network sends the 'Registration Accept' to the modem.

A Radio Interface layer of the UE 102 determines the availability of the edge server (106a-106n) based on the 'Registration Accept' response received from the 5G core network. The enablement module 110 validates the availability of the edge server (106a-106n) using the system properties of the UE 102. On determining that the edge server (106a-106n) is available to the base station that is in communication with the UE 102, the enablement module 110 updates the status bar on the UE 102 indicating the availability of the edge server.

Further, the enablement module 110 queries the Life Cycle Management (LCM) proxy associated with the 5G core network to obtain the information about the list of available applications at the edge server (106a-106n). The LCM proxy may send the list of available applications at the edge server (106a-106n) to the enablement module 110. The enablement module 110 assigns the indications/badge notifications to the applications available at the edge server (106a-106n).

Figure 9C:
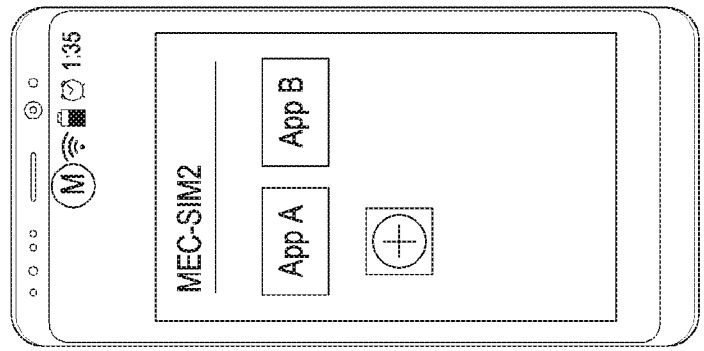
FIGS. 9A, 9B and 9C are example diagrams illustrating creation of a folder structure for indicating the availability of an edge server for one or more applications, according to embodiments as disclosed herein.
Figure 9B:
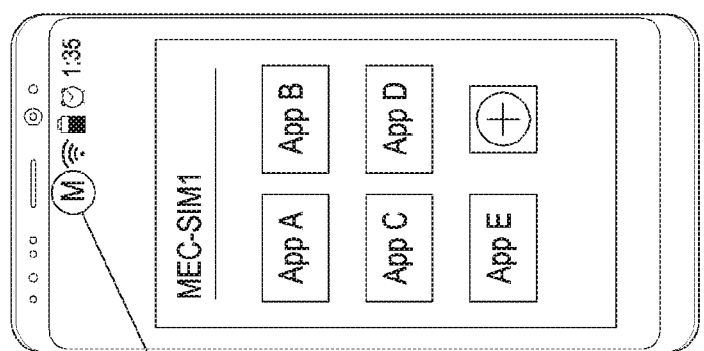
Figure 9A:
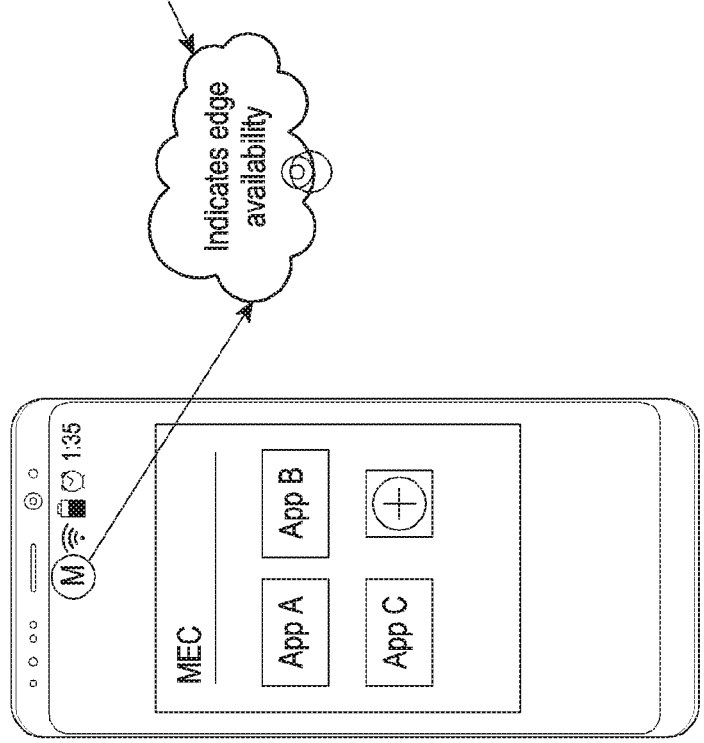

FIGS. 9A, 9B and 9C are example diagrams illustrating creation of a folder structure for indicating the availability of the edge server (106a-106n) for the one or more applications, according to embodiments as disclosed herein. The enablement module 110 instructs the display module 114 to update the status bar on determining the availability of the edge server (106a-106n). In an example herein, the display module 114 notifies the user about the edge server availability by means of 'M' letter/icon on the status bar. Further, the display module 114 creates the MEC folder and inserts the one or more applications available at the edge server in the created folder.

In case of a single SIM, the display module 114 creates the folder which contains the one or more applications supported on the edge server (106a-106n) as illustrated in FIG. 9A.

In case of multiple SIMs, the display module 114 creates the folders with respect to the SIMs and inserts the applications available at the respective edger servers (106a-106n) in the folders as illustrated in FIGS. 9B and 9C. In an example herein, the folder created with respect to the SIM1 can include applications A-E which are available on the edge server (106a-106n). In an example herein, the folder created with respect to the SIM2 can include the app A and the app B which are supported on the edge server (106a-106n).

Figure 9D:
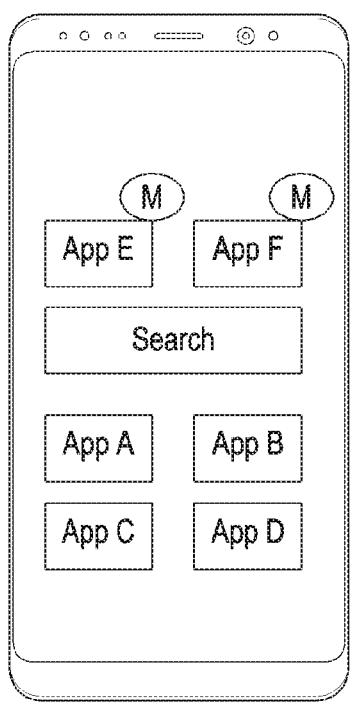
FIG. 9D is an example diagram illustrating assignment of badge notifications for one or more applications available at an edge server, according to embodiments as disclosed herein.

FIG. 9D is an example diagram illustrating assignment of the badge notifications for the one or more applications available at the edge server (106a-106n), according to embodiments as disclosed herein. In an example herein, a letter 'M' can be added to the applications for indicating the availability of the edge server (106a-106n) for the applications. The letter 'M' can be assigned to an app E and an app F that informs the user about the availability of the edge server (106a-106n) for the app E and the app F.

FIG. 9E is an example diagram illustrating providing of user notifications for indicating the availability of the edge server (106a-106n), according to embodiments as disclosed herein. After boot up operation (which can comprise of the UE 102 starting up, the UE 102 exiting flight mode, and so on), the enablement module 110 determines that the availability of the edge server (106a-106n) using the 5G registration procedure and receives the list of available applications from the LCM proxy. The enablement module 110 instructs the display module 114 to create the folder to insert the applications available at the edge server (106a-106n) or to provide the badge notifications to the applications available at the edge server (106a-106n). In an example herein, the user selects the app E (which is available at the edge server) based on at least one of the badge notifications and the folder. On selecting the app E, the user can be provided with the interface to select the network slice of the SIM during the application launch. For example, the user can select the network slice 1 of the SIM based on the latency. Thus, after the application launch, the user can use the network slice 1 of the SIM1 for managing the app E.

Figure 10:
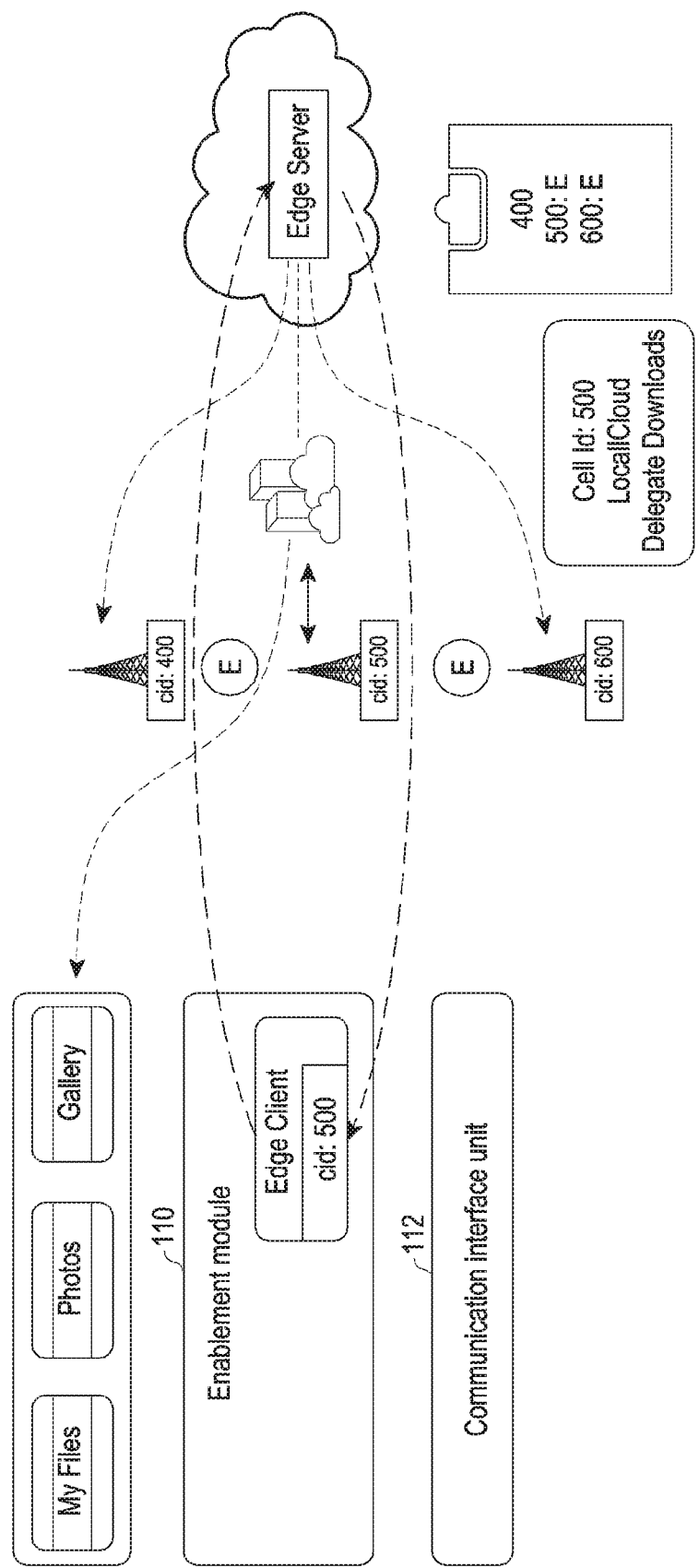
FIG. 10 depicts an example diagram, wherein the local storage is adapted with an edge server for offload downloading contents without user intervention contents, according to the embodiments as disclosed herein.

FIG. 10 depicts an example diagram, wherein the local storage is adapted with the edge server for uploading the contents, according to the embodiments as disclosed herein. Embodiments herein enable the enablement module 110 to inform the user about the local storage adapted with the edge server (106a-106n). Thus, the user can delegate the task of downloading the contents (files, video, photos, and so on) to the local cloud adapted with the edge server. In addition, the user can share information about the uploaded content with other users. The user can also obtain the downloaded contents from the edge server which helps in reducing usage of the device storage. Thus, adapting the local cloud with the edge server (106a-106n) helps in increasing the storage capacity and provides a seamless content sharing experience.

FIGS. 11A-11H depict example tables, wherein values of the table can be used for determining the network rating, according to embodiments as disclosed herein. Embodiments herein enable the enablement module 110 to recommend at least one of the application, the RAT, the SIM, and the network slice of the SIM for the particular service at the particular location based on the network rating. The network rating (NWR) can be determined based on the network parameters such as, but not limited to, signal strength, network load information, network slice availability, edge availability, RTT and so on. The network rating can be calculated as:

$$NWR = W1*SS + W2*C + W3*NL + W4*E + W5*S$$

Wherein, W1-W5 represent the weightage considered based on at least one of the signal strength thresholds, the charging thresholds, the RTT thresholds, the network load, the availability of the edge server and the network slice and so on. Typical values for range of the network parameters are illustrated in FIGS. 11A-11H.

Figure 12:
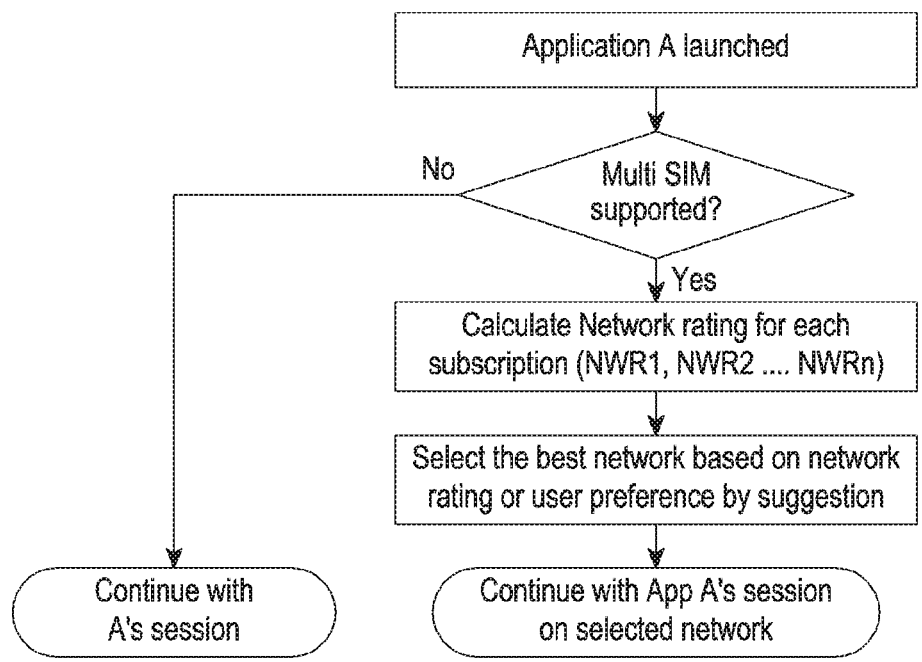
FIG. 12 is an example flow diagram illustrating recommendation of a RAT for completing a requested service at a particular location based on a network rating, according to embodiments as disclosed herein.

FIG. 12 is an example flow diagram illustrating recommendation of the RAT for completing the requested service at the particular location based on the network rating, according to embodiments as disclosed herein. Consider an example scenario, wherein an app A has launched supporting the video streaming service. The enablement module 110 checks whether the UE 102 supports multiple SIMs or not. On determining the UE 102 does not support multiple SIMs, the enablement module 110 suggests the user to continue with the app A's session.

On determining that the UE 102 supports multiple SIMs, the enablement module 110 determines the network rating for the one or more RATs/subscriptions supported by the base station (104a-104n) in communication with the UE 102. The enablement module 110 selects the RAT from the one or more RATs for completing the video streaming service based on the network rating. In an embodiment, the enablement module 110 may select the RAT on receiving the input from the user for completing the video streaming service. Further, the enablement module 110 suggests the user to continue the video streaming service on the selected RAT. In an example herein, the one or more RATs supported by the base station in communication with the UE 102 may be LTE, 5G and Wi-Fi. The enablement module 110 calculates the network rating for LTE, 5G and Wi-Fi and identifies that 5G may have better network rating. Thus, the enablement module 110 recommends 5G as the best RAT for continuing the video streaming service.

FIG. 13 is an example table illustrating availability of the edge server/network slice of the SIM for recommending the application for the requested service at the particular location, according to embodiments as disclosed herein. Consider an example scenario, wherein the user is watching a live event and an app A and an app B are the applications supporting the streaming of the live event. The enablement module 110 determines the network rating for the app A and the app B based on the parameters such as, but not limited to, the signal strength, the network load information, the RTT, availability of the edge server and the network slice, the charging details and so on. Example values of the parameters with respect to the app A and the app B are illustrated in the table. The network rating calculated for the app A (NRA) using the example values of the parameters associated with the app A may be NRA=0.15*5(SignalStrength)+0.1*4(Charging)+ 0.15*1(Network load)+0(edge)+0(network slice)=1.3

Similarly, the network rating calculated for the app B (NRB) using the example values of the parameters associated with the app B may be:

NRB=0.15*5(SignalStrength)+0.1*3(Charging)+ 0.15*1(Network load)+1*0.3(edge)+1*0.3(network slice)=1.8

The enablement module 110 determines that the network rating calculated for the app B may be higher than that of the app A. The network rating of the app B may be higher because of the availability of the edge server and the network slice for the app B. Thus, the enablement module 110 selects the app B for watching the live event based on the performance factor even though the charging details associated with the app A is less.

FIGS. 14A and 14B depict example tables, wherein the values of the example table are used to recommend the SIM for the requested service at the particular location, according to embodiments as disclosed herein. Consider an example scenario, wherein the user wants to watch a video and an app A may be recommended for video streaming. Further, the UE 102 comprises a SIM1 and a SIM2, that support the app A. The enablement module 110 determines the network rating for the SIM1 and the SIM2 based on the parameters such as, but not limited to, the signal strength, the network load information, the RTT, availability of the edge server and the network slice, the charging details and so on. Example values of the parameters with respect to the SIM1 and the SIM2 are illustrated in the table as illustrated in FIG. 14A. The network rating calculated for the SIM1 (NR1) using the example values of the parameters associated with the SIM1 may be NR1=0.05*5(SignalStrength)+0.7*4(Charging)+ 0.05*1(Network load)+0(edge)+0(network slice)=3.1

Similarly, the network rating calculated for the SIM2 (NR2) using the example values of the parameters associated with the SIM2 may be:

NR2=0.05*5(SignalStrength)+0.7*3(Charging)+ 0.05*1(Network load)+0(edge)+1*0.1(network slice)=2.5

The enablement module 110 determines that the network rating calculated for the SIM1 may be higher than that of the SIM2. Thus, the enablement module 110 selects the SIM1 for the app A (which is supporting the video streaming service) based on the cost effectiveness factor even though the SIM2 has network slice.

Consider an example autonomous car driving use case where performance/latency is priority over cost. Further, the app B supports the autonomous car driving related service. The enablement module 110 determines the network rating for the SIM1 and the SIM2 based on the parameters such as, but not limited to, the signal strength, the network load information, the RTT, availability of the edge server and the network slice, the charging details and so on. Example values of the parameters with respect to the SIM1 and the SIM2 are illustrated in the table as illustrated in FIG. 14B. The network rating calculated for the SIM1 (NR1) using the example values of the parameters associated with the SIM1 may be NR1=0.15*5(SignalStrength)+0.1*5(Charging)+ 0.15*1(Network load)+0(edge)+0(network slice)=1.4

Similarly, the network rating calculated for the SIM2 (NR2) using the example values of the parameters associated with the SIM2 may be:

NR2=0.15*5(SignalStrength)+0.1*3(Charging)+ 0.15*1(Network load)+1*0.3(edge)+1*0.3(network slice)=1.8

The enablement module 110 determines that the network rating calculated for the SIM2 may be higher than that of the SIM1. Thus, the enablement module 110 selects the SIM2 for the app B (which is supporting the autonomous car driving related service) based on the performance factor even though the charging details associated with the SIM1 is less.

Figure 15A:
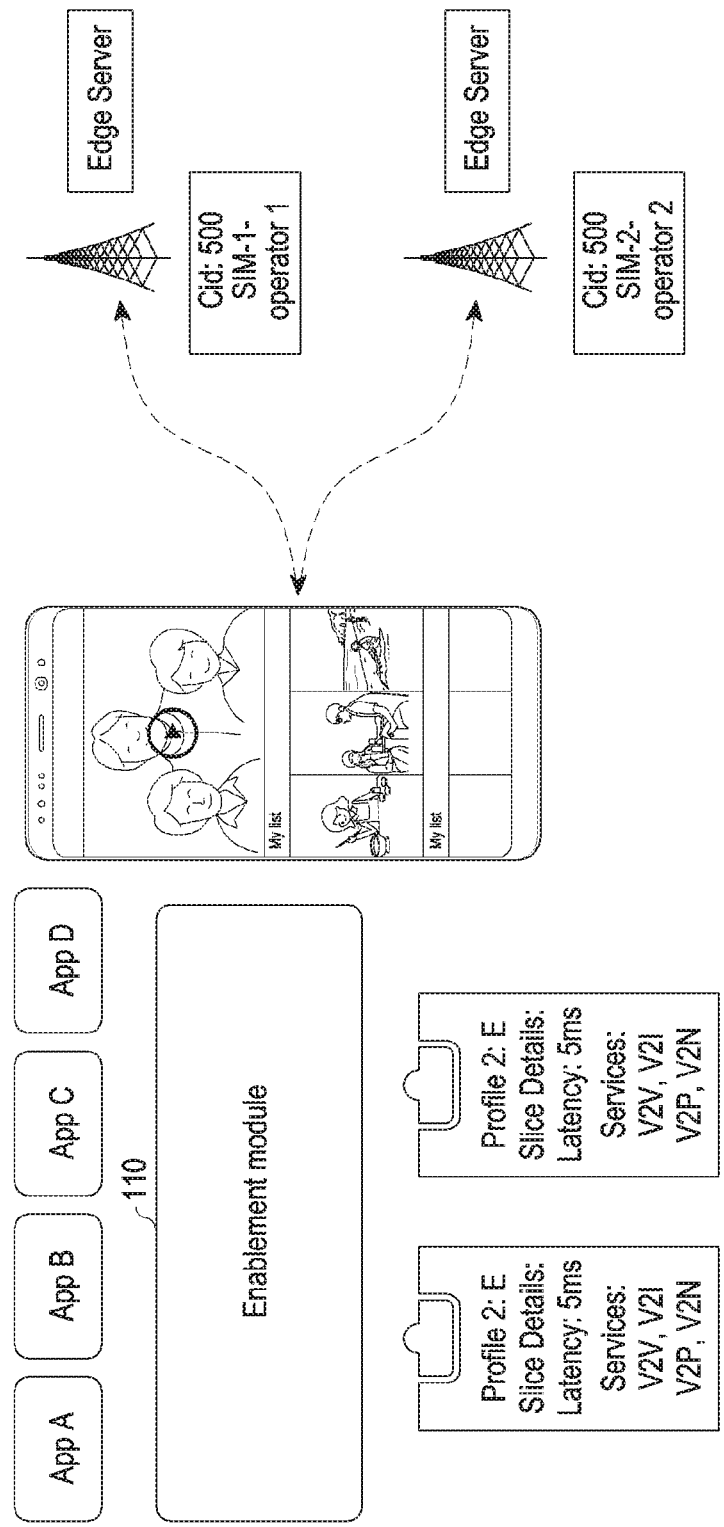
FIGS. 15A and 15B are example diagrams illustrating recommendation of a SIM for a requested service at a particular location, according to embodiments as disclosed herein.
Figure 15B:
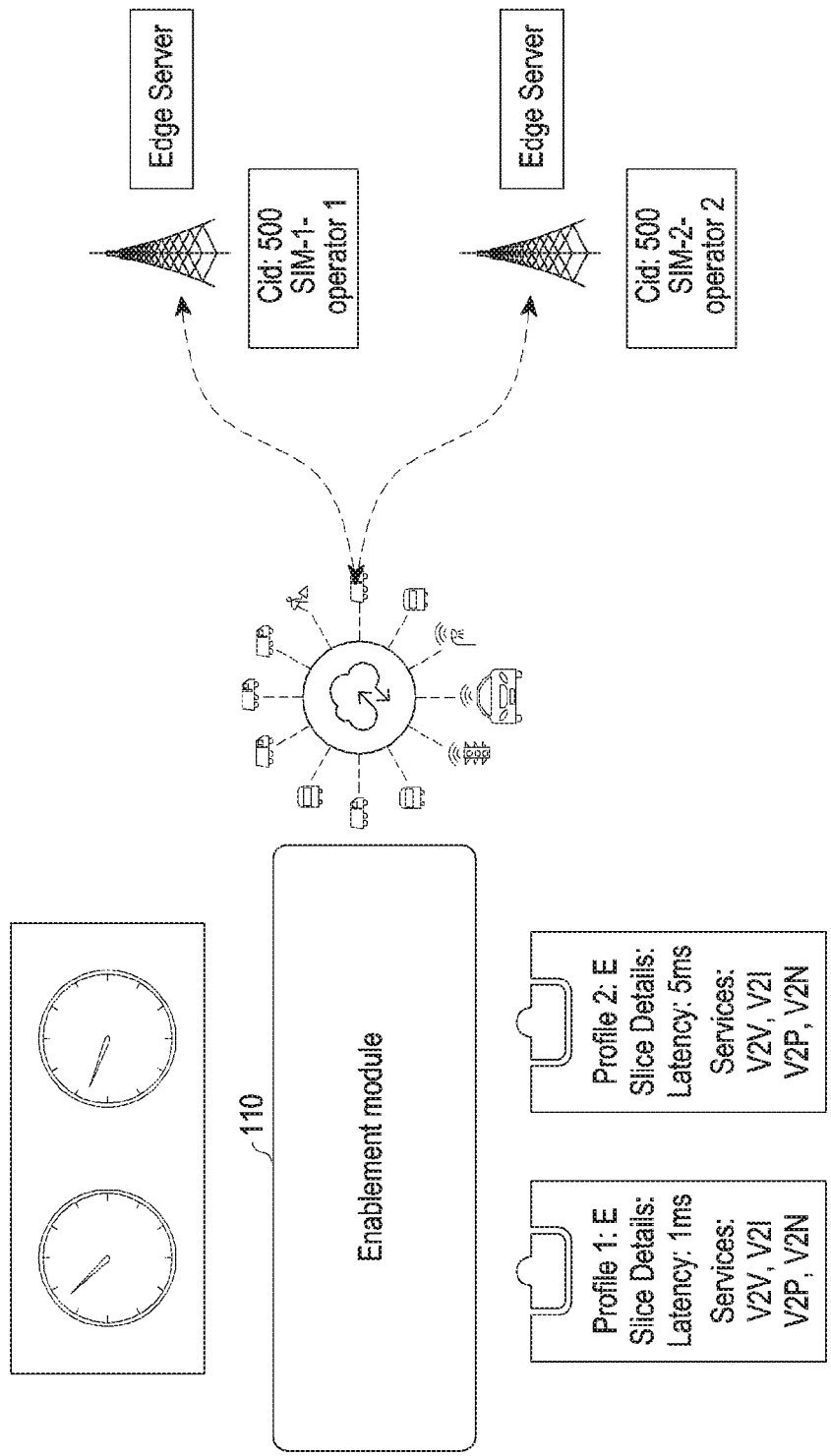

FIGS. 15A and 15B are example diagrams illustrating recommendation of the SIM for the requested service at the particular location, according to embodiments as disclosed herein. Consider an example scenario as illustrated in FIG. 15A, wherein the user wants to watch a movie and an app A, an app B, an app C and an app D may be the applications available on the UE 102 supporting video/movie streaming service. Further, the enablement module 110 recommends the app A for watching the movie on the UE 102 at the particular location.

Further, the UE 102 supports a SIM1 of an operator 1 and a SIM2 of an operator 2. The serving cell of cid 500 of the base station in communication with the UE 102 can be operated by the operator 1 and the operator 2. Thus, the enablement module 110 determines the availability of the edge server (106a-106n) for the base station (communicating with the UE 102) with respect to the operator 1 and the operator 2.

In an example herein, the edge server (106a-106n) may be available for the SIM1 operating by the operator 1 and the SIM2 operating by the operator 2. On determining the availability of the edge server (106a-106n), the enablement module 110 determines the applications available at the edge server (106a-106n) with respect to the SIM1 and the SIM2. In an example herein, the edge server (106a-106n) available for the SIM1/operator 1 may include the app A, the app B and the app D. The edge server (106a-106n) available for the SIM1/operator 1 may include the app C. The enablement module 110 selects the SIM1/operator 1 for the recommended app A, since the edge server (106a-106n) available for the SIM1/operator 1 includes the app A. Thus, the enablement module 110 suggests the user to use the app A and the SIM1 for the app A to watch the movie.

Consider an example autonomous driving case as illustrated in FIG. 15B and the UE 102 supports a SIM1 of an operator 1 and a SIM2 of an operator 2. The serving cell of cid 500 of the base station in communication with the UE 102 can be operated by the operator 1 and the operator 2. Thus, the enablement module 110 determines the availability of the edge server (106a-106n) for the base station (communicating with the UE 102) with respect to the operator 1 and the operator 2. In an example herein, the edge server (106a-106n) may be available for the SIM1 operating by the operator 1 and the SIM2 operating by the operator 2.

Further, the enablement module 110 checks the characteristics of the network slices associated with the SIM1 and the SIM2. In an example herein, the characteristics of the network slice associated with the SIM1 can include latency of 1 ms and services such as V2V, V2I, V2P, V2N and so on. The characteristics of the network slice associated with the SIM2 can include latency of 5 ms and services such as V2V, V2I, V2P, V2N and so on. The enablement module 110 provides the suggestions to the user to use the SIM1/ operator 1 for autonomous driving related applications, since the latency of the network slice associated with the SIM1 is of 1 ms.

FIGS. 16A, 16B, 16C and 16D are example diagrams illustrating recommendation of the network slice from the one or more network slices associated with the SIM for the requested service, according to embodiments as disclosed herein.

Figure 16A:
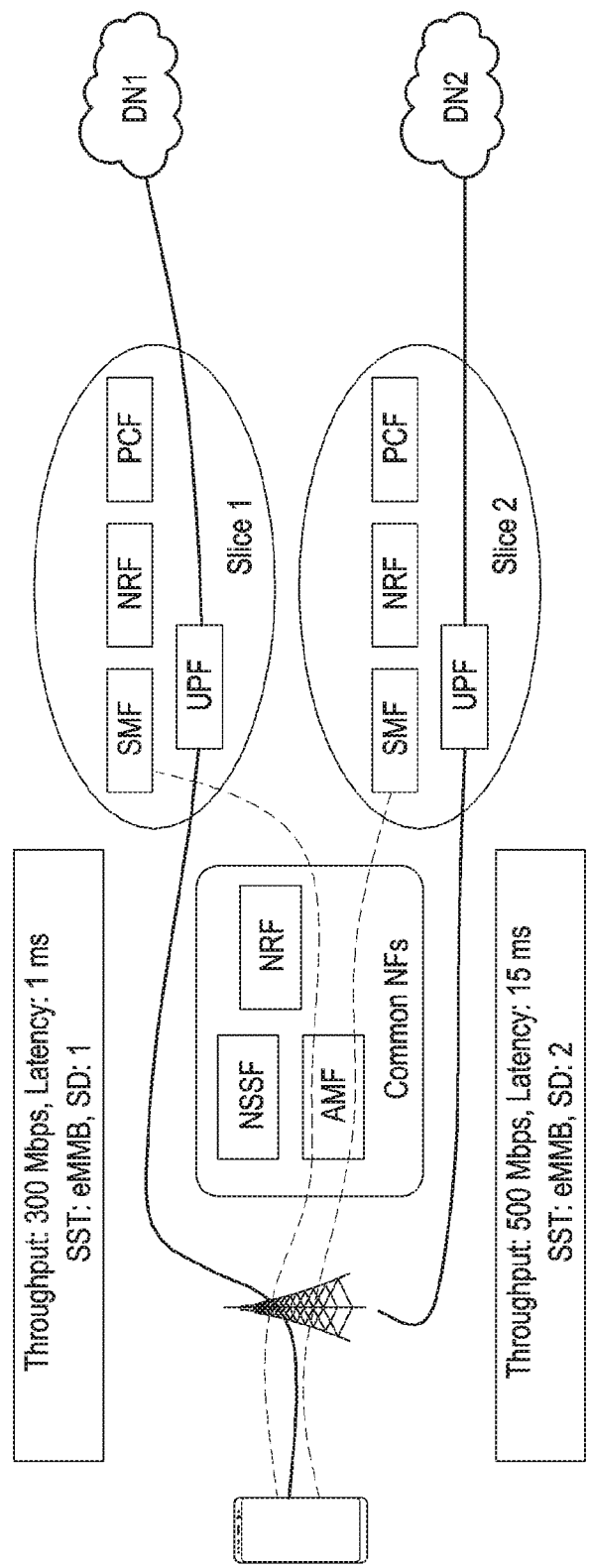
FIGS. 16A, 16B, 16C and 16D are example diagrams illustrating recommendation of a network slice from one or more network slices associated with one or more SIMs for a requested service, according to embodiments as disclosed herein.

FIG. 16A depicts an example diagram, wherein the network slice can be recommended based on the characteristics of the one or more network slices associated with the SIM. Consider an example scenario as illustrated in FIG. 16A, wherein a network slice 1 and a network slice 2 are network slices permitted for the same RAT/subscription. The network slice 1 and the network slice 2 are of eMBB (Enhanced Mobile Broadband) network slice/Service Type (SST) but having different characteristics. Further, the network slice 1 has a throughput of 300 Mbps and latency of 1 ms and the network slice 2 has a throughput of 500 Mbps and latency of 15 ms. Thus, the enablement module 110 can select the network slice 1 for the SIM that can be used for completing the requested service. In addition, the enablement module 110 can suggest the user to buy the network slice/subscription for completing the requested service.

Figure 16B:
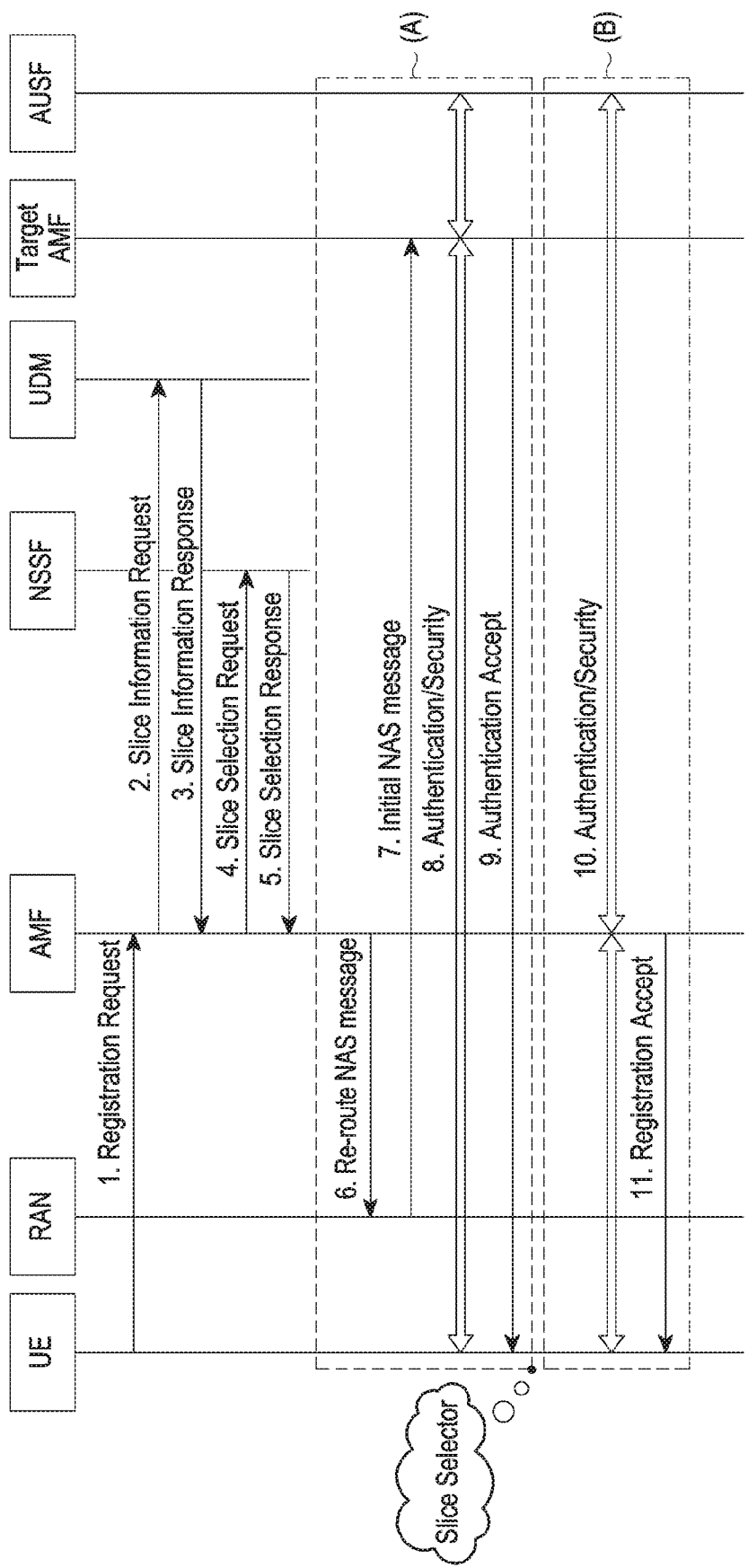

FIG. 16B depicts an example diagram, wherein the network slice can be recommended based on the identification of allowed set of network slices. Consider an example scenario, wherein the UE 102 has successfully completed its registration procedure. Upon successful completion of the registration procedure, the UE may obtain information about a set of allowed network slices for a registration area from the AMF instance that is serving the UE 102. Once the information about the set of allowed network slices is obtained, the enablement module 110 keeps track of the allowed network slices and recommends the network slice of the SIM for completing the requested service. The enablement module 110 can also provide an interface to the user for selecting the network slice for the requested service. In addition, the enablement module 110 can suggest the user to buy the new network slice for completing the requested service.

Figure 16C:
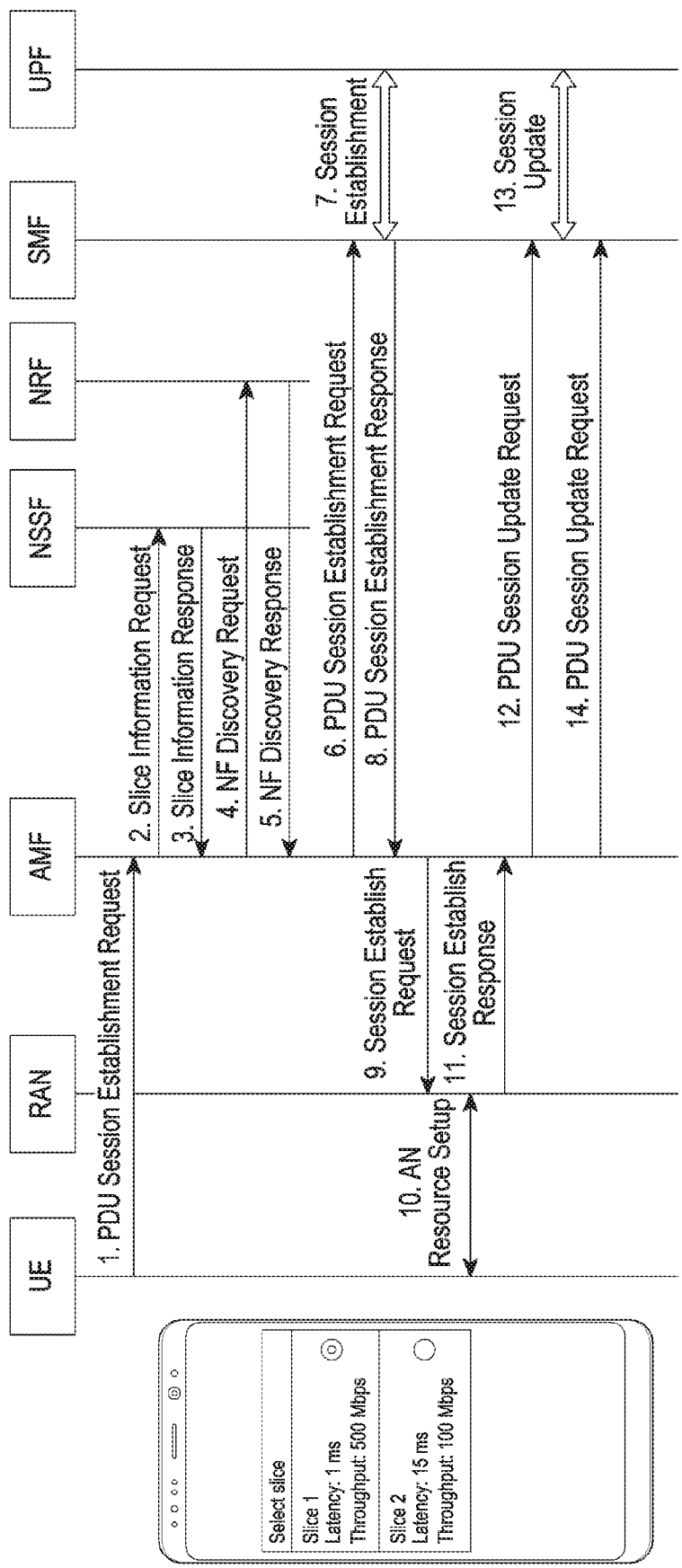

FIG. 16C is an example diagram illustrating extraction of the network slice related information based on a selection of the network slice by the user. Consider an example scenario as illustrated in FIG. 16C, wherein the user selects a network slice 1 of the SIM1 to be used for the recommended application to complete the requested service. Based on the user selection, the enablement module 110 instructs the modem to send a Protocol Data Unit (PDU) Session Establishment Request to the AMS for obtaining details regarding the selected network slice. The details can be, but not limited to, Data Network Name (DNN), SSC mode, and session type.

Figure 16D:
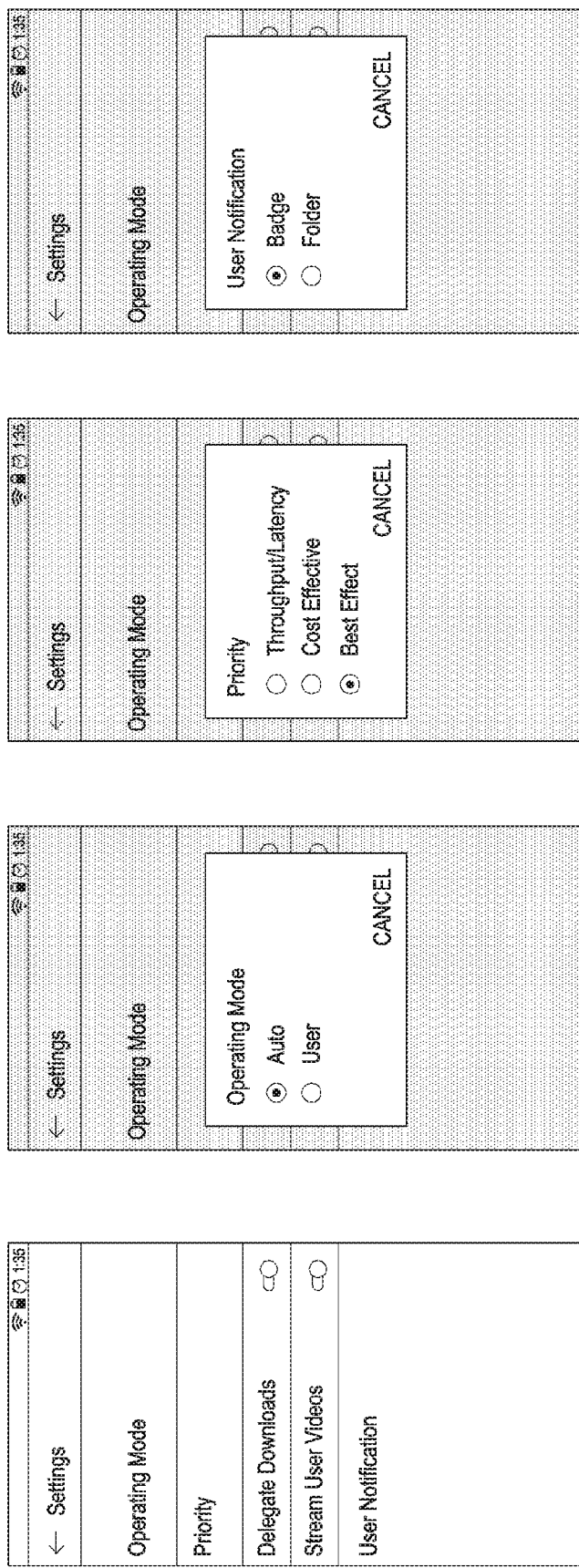

FIG. 16D is an example diagram illustrating the user mode for selecting the network slice for the particular service. Embodiments herein provide the user mode and the auto mode for selecting the network slice. In the auto mode, the enablement module 110 selects the network slice of the SIM for the particular service based on the user priorities set (includes the cost effective factor, the performance factor and the best effort factor). In the user mode, during the application launch, the user may provide with the options to select the SIM/network slice. Each option may contain the edge availability details for the particular service. In addition, the user may be provided an interface to select a form of notification (the badge notifications/creation of the folder) for indicating the availability of the edge server.

Figure 17A:
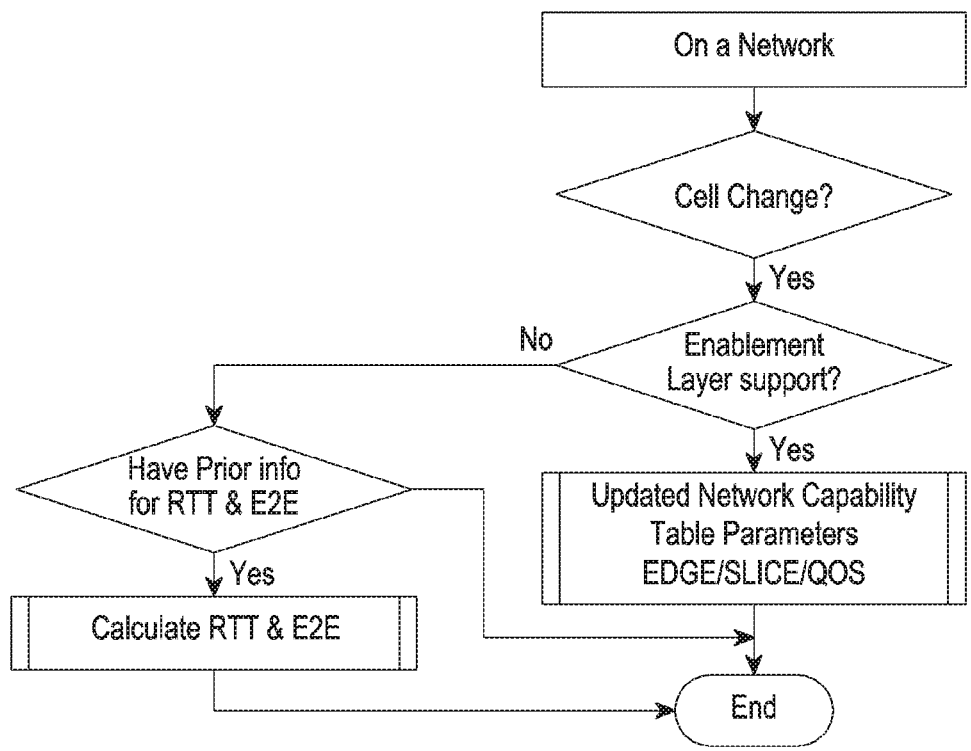

FIGS. 17A and 17B are example diagrams illustrating updating of the network capabilities based on the cell change for recommending at least one of the network slice and the RAT for the requested service, according to embodiments as disclosed herein.

As illustrated in FIG. 17A, on determining the cell location changes, the UE 102 checks for the support of the enablement layer for the changed cell location. On determining that the enablement layer does not support, the UE 102 checks for an availability of prior information in the memory 108 for the RTT and the E2E delay. On determining the availability of the prior information for the RTT and the E2E delay, the UE 102 updates the local database with the RTT and the E2E delay. Otherwise, the UE 102 calculates the RTT and the E2E delay and updates the local database.

On determining the support of the enablement layer, the UE 102 instructs the enablement module 110 to update the local database with the availability of the edge server (106a-106n) and the network slice, QoS and other network parameters for the one or more applications. Thus, the enablement module can use the updated local database (as illustrated in FIG. 17B) for recommending the at least one of the RAT/subscription and the network slice to the user for completing the particular service.

Figure 18:
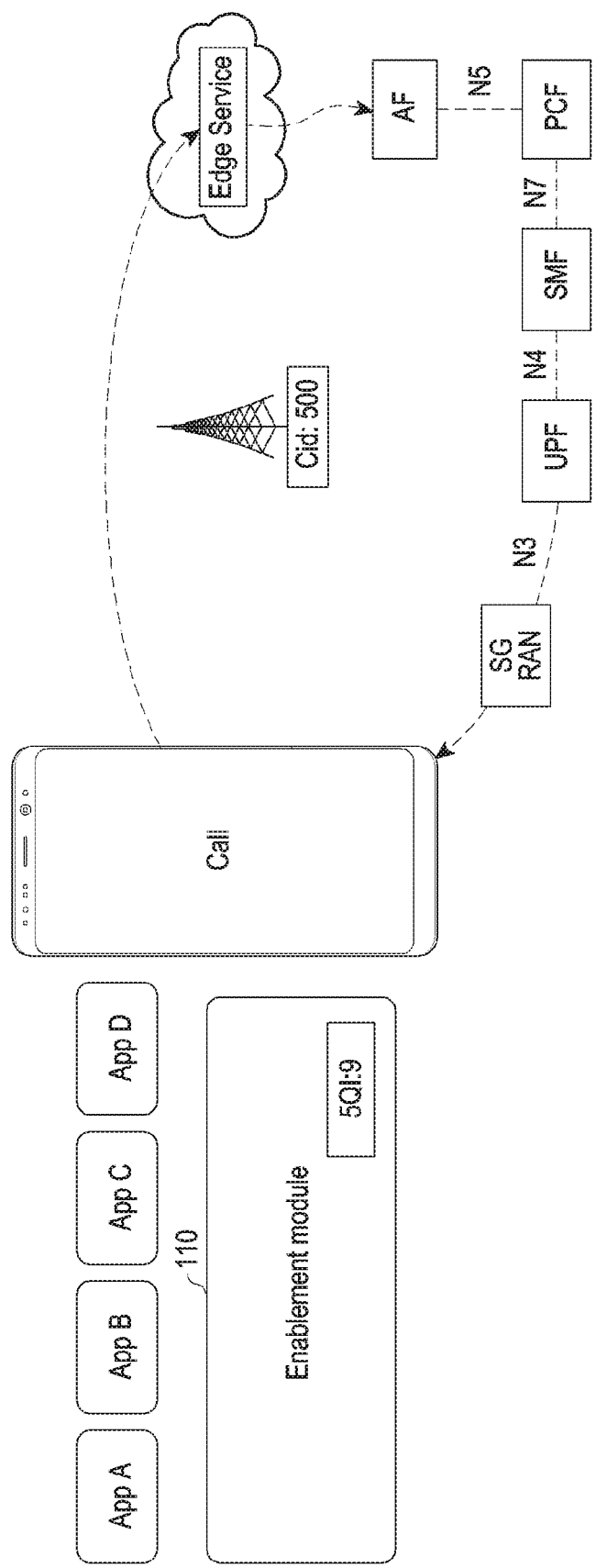
FIG. 18 is an example diagram illustrating feature based Quality of Service (QoS) manipulation for call related applications, according to embodiments as disclosed herein.

FIG. 18 is an example diagram illustrating feature based Quality of Service (QoS) manipulation for the call related applications, according to embodiments as disclosed herein.

Embodiments herein enable the enablement module 110 to prioritize the applications on determining that the non-availability of the edge server. In order to prioritize, the enablement module 110 assigns the 5QI values for the applications and displays the 5QI values to the RAT for providing better bandwidth and latency. A higher 5QI value assigned to the applications indicates the RAT for providing the better bandwidth and the latency. In an example herein, the enablement module 110 can assign 5QI:9 for the call/OTT related applications for getting better bandwidth and latency for the OTT related applications.

Figure 19:
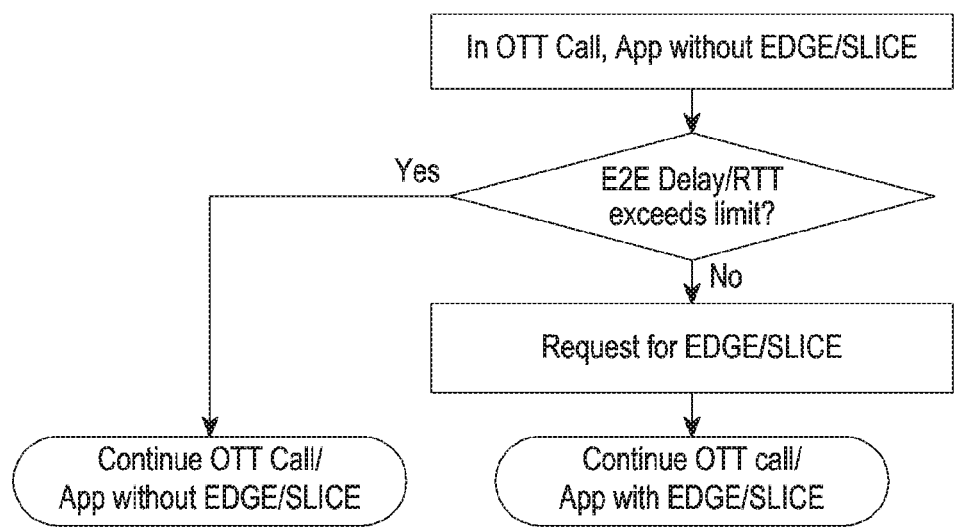
FIG. 19 is an example flow diagram illustrating handling of at least one of network slice and edge availability for recommending an application for a particular service, according to embodiments as disclosed herein.

FIG. 19 is an example flow diagram illustrating handling of at least one of the network slice and the edge availability for recommending the application for the particular service, according to embodiments as disclosed herein. Consider an example scenario, wherein the OTT call is made by the user and further the edger server or the network slice is not available for the OTT call applications. In such scenario, the enablement module 110 checks whether at least one of the RTT and E2E delay exceeds a limit. On determining that the at least one of the RTT and E2E delay exceeds the limit, the enablement module 110 suggests the user to continue the call using the OTT applications without the edge server (106a-106n)/the network slice.

On determining that the at least one of the RTT and E2E delay does not exceed the limit, the enablement module 110 suggests make a request with the 5G core network for the edge server (106a-106n) or with the AMF for the network slice. The enablement module 110 can also suggest the user to buy the network slice. If the request is successfully registered, the enablement module 110 suggests the user to continue the OTT call using the application for which the edge server and the network slice are available.

Figure 20:
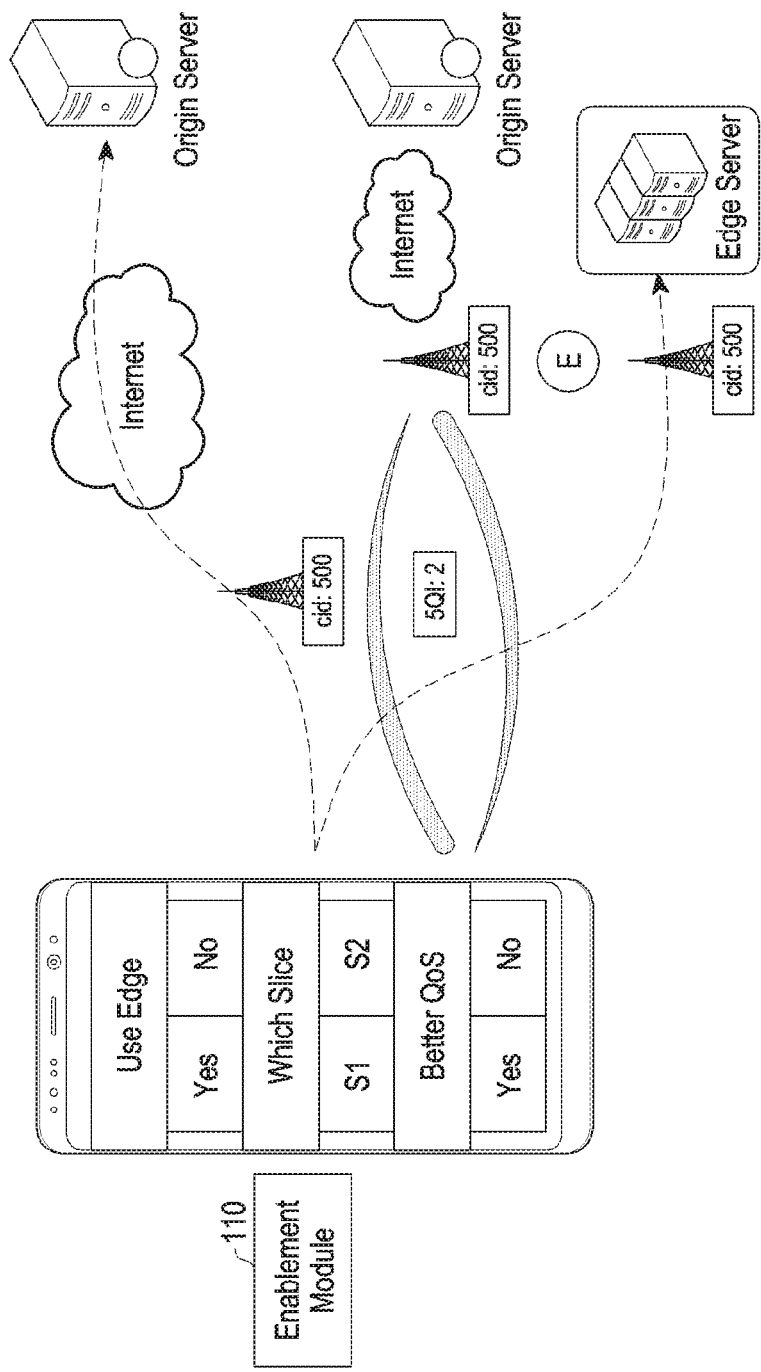
FIG. 20 is an example diagram illustrating providing of the recommendations for completing the service(s) at the particular location, according to embodiments as disclosed herein.

FIG. 20 is an example diagram illustrating providing of the recommendations for completing the service(s) at the particular location, according to embodiments as disclosed herein. For example, consider an example scenario as illustrated in FIG. 20, wherein the UE 102 is in communication with the cell of cid 500 of the base station (104a-104n). The edge server (106a-106n) may be or may not be placed near the base station serving the cell of cid 500.

On receiving the request from the user for the service (the video streaming service, the file downloading service and so on) at the particular location, the enablement module 110 provides recommendations to the user for the completing the service based on tracking of the available resources. Based on the request, the enablement module 110 provides an interface for the user to select factors for providing the recommendations. The factors can be, but not limited to, the edge server, the network slice, the QoS and so on.

If the user selects the edge factor, then the enablement module 110 provides the recommendations to the user for completing the requested service based on the availability of the edge server. If the user selects the network slice for the particular service, the application recommended for the requested service can be used based on the selected network slice. If the user selects the better QoS factor, then the enablement module prioritizes the applications for which the edge server is not available. The applications can be prioritized by assigning 5QI values. Further, the 5QI value can be shared with the RAT/cell of cid 500 associated with the base station to provide the better bandwidth and latency for the applications. In an example herein, the enablement module 110 may assign 5QI:2 for live streaming and 5QI:4 for buffer streaming. Thus, the QoS of the applications can be improved by prioritizing the traffic of such applications.

The embodiments disclosed herein can be implemented through at least one software program running on at least one hardware device and performing network management functions to control the elements. The elements shown in FIG. 1A, FIG. 1B, and FIG. 2 can be at least one of a hardware device, or a combination of hardware device and software module.

The embodiments disclosed herein describe methods and systems for providing recommendations for completing service(s) on a User Equipment (UE) at a particular location. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in an embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the disclosure may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for providing at least one recommendation for performing at least one service on a User Equipment (UE), the method comprising:
    obtaining, by the UE, a request for performing at least one service;
    determining, by the UE, at least one network parameter corresponding to the at least one service, wherein the at least one network parameter comprises an availability of at least one edge server;
    determining, by the UE, the at least one recommendation using the determined at least one network parameter, wherein the at least one recommendation comprises a first recommendation of at least one of: an application from at least one application supporting the at least one service, a Radio Access Technology (RAT) from at least one RAT supported by the UE, a SIM from at least one SIM supported by the UE, and a network slice from network slices associated with the at least one SIM; and
    performing, by the UE, the at least one service using the determined at least one recommendation.

2. The method of claim 1, further comprising providing, by the UE, the determined at least one recommendation to a user for performing the at least one service.

3. The method of claim 1, wherein the at least one service includes a multimedia streaming service, a call related service, a file download service, a carousel service, a television (TV) service, and a media on demand service.

4. The method of claim 1, wherein the at least one network parameter further comprises at least one of: a Round Trip Time (RTT), an End-to-End (E2E) delay, an availability of network slices for at least one Subscriber Identity Module (SIM), characteristics of available network slices, charging details, signal conditions, and network load.

5. The method of claim 4, wherein determining the availability of the at least one edge server includes:
    transmitting, by the UE, a registration request to a core network for determining a change in a location of a cell associated with a base station in communication with the UE; and
    determining, by the UE, the availability of the at least one edge server and at least one application available at the at least one edge server based on a registration response received from the core network in response to the registration request,
    wherein the method further comprises performing, by the UE, at least one User Interface (UI) based action to indicate the availability of the at least one edge server for the at least one application, and wherein the at least one UI based action includes:
providing at least one badge notification to the at least one application that is available at the at the least one edge server, and
creating a folder based on the availability of the at least one edge server for the at least one application, wherein the folder includes the at least one application available at the at the least one edge server.

6. The method of claim 4, wherein determining the availability of the at least one edge server includes:
transmitting, by the UE, a registration request to a core network for determining a change in a location of a cell associated with a base station in communication with the UE; and
determining, by the UE, the availability of the at least one edge server and at least one application available at the edge server based on a registration response received from the core network in response to the registration request,
wherein the method further comprises uploading, by the UE, at least one content to the at least one edge server, wherein the at least one content uploaded in the at least one edge server is downloaded by at least one other UE.

7. The method of claim 4, wherein determining the availability of the at least one edge server includes:
calculating the RTT for at least one application supporting the at least one service based on each cell of at least one cell associated with a base station in communication with the UE, wherein the at least one service is at least one throughput based service;
averaging the calculated RTT for the at least one application supporting the at least one service; and
determining that the at least one edge server is available for the at least one service if the averaged RTT has a lowest value.

8. The method of claim 4, wherein determining the availability of the at least one edge server includes:
calculating the E2E delay for at least one application supporting the at least one service based on each cell of at least one cell associated with a base station in communication with the UE, wherein the at least one service includes at least one call based service;
averaging the calculated E2E delay for the at least one application supporting at least one second service; and
determining that the at least one edge server is available for the at least one service if the averaged E2E has a lowest value.

9. The method of claim 1, further comprising:
determining, by the UE, a network rating for at least one application supporting the at least one service based on the determined at least one network parameter;
recommending, by the UE, an application from the at least one application for the at least one service using the determined network rating; and
providing, by the UE, the at least one recommendation based on the network rating,
wherein providing the at least one recommendation includes at least one of:
recommending, by the UE, the RAT from the at least one RAT supported by the UE for the application determined for the request, wherein the RAT is recommended using the network rating determined for the at least one RAT supported by the UE,
recommending, by the UE, a SIM from at least one SIM for the application determined for the at least one service, wherein the SIM is determined using at least one of the network rating determined for the at least one SIM and characteristics of network slices available for the at least one SIM, and
recommending, by the UE, a network slice for the SIM to be used for the application determined for the at least one service, wherein the network slice is determined using at least one of the network rating determined for the at least one SIM and the characteristics of the network slices available for the at least one SIM, and
wherein a user input is received to determine the SIM and the network slice for the application recommended for the at least one service.

10. A User Equipment (UE) supporting at least one Subscriber Identity Module (SIM) and at least one Radio Access Technology (RAT), the UE comprising:
a transceiver;
a memory; and
at least one processor coupled to the memory and the transceiver, wherein the at least one processor is configured to:
obtain a request for performing at least one service,
determine at least one network parameter corresponding to the at least one service, wherein the at least one network parameter comprises an availability of at least one edge server,
determine at least one recommendation using the determined at least one network parameter, wherein the at least one recommendation comprises a first recommendation of at least one of: an application from at least one application supporting the at least one service, a Radio Access Technology (RAT) from at least one RAT supported by the UE, a SIM from at least one SIM supported by the UE, and a network slice from network slices associated with the at least one SIM, and
perform the at least one service using the determined at least one recommendation.

11. The UE of claim 10, wherein the at least one processor is further configured to determine at least one recommendation to a user for performing the at least one service.

12. The UE of claim 10, wherein the at least one service includes a multimedia streaming service, a call related service, a file download service, a carousel service, a television (TV) service, and a media on demand service.

13. The UE of claim 10, wherein the at least one network parameter further comprises at least one of: a Round Trip Time (RTT), an End-to-End (E2E) delay, availability of network slices for at least one Subscriber Identity Module (SIM), characteristics of the available network slices, charging details, signal conditions, and network load.

14. The UE of claim 13, wherein the at least one processor is further configured to:
transmit a registration request to a core network on determining a change in a location of a cell associated with a base station in communication with the UE;
determine the availability of the at least one edge server and at least one application available at the at least one edge server based on a registration response received from the core network in response to the registration request; and
perform at least one User Interface (UI) based action to indicate the availability of the at least one edge server for at least one application,
wherein the at least one UI based action includes:
providing at least one badge notification to the at least one application that is available at the at the least one edge server, and creating a folder based on the availability of the at least one edge server for the at least one application, wherein the folder includes the at least one application available at the at the least one edge server.

15. The UE of claim 13, wherein the at least one processor is further configured to:
transmit a registration request to a core network on determining a change in a location of a cell associated with a base station in communication with the UE;
determine the availability of the at least one edge server and at least one application available at the at least one edge server based on a registration response received from the core network in response to the registration request; and
upload at least one content to the at least one edge server, wherein the at least one content uploaded in the at least one edge server is downloaded by at least one other UE.

16. The UE of claim 13, wherein the at least one processor is further configured to:
calculate the RTT for at least one application supporting the at least one service based on each cell of at least one cell associated with a base station in communication with the UE, wherein the at least one service is at least one throughput based service;
average the calculated RTT for the at least one application supporting the at least one service; and
determine that the at least one edge server is available for the at least one service if the averaged RTT has a lowest value.

17. The UE of claim 13, wherein the at least one processor is further configured to:
calculate the E2E delay for at least one application supporting the at least one service based on each cell of at least one cell associated with a base station in communication with the UE, wherein the at least one service at least one call based service;
average the calculated E2E delay for the at least one application supporting at least one second service; and
determine that the at least one edge server is available for the at least one service if the averaged E2E has a lowest value.

18. The UE of claim 10, wherein the at least one processor is further configured to:
determine a network rating for at least one application supporting the at least one service based on the determined at least one network parameter;
recommend an application from the at least one application for the at least one service using the determined network rating; and
provide the at least one recommendation based on the network rating,
wherein providing the at least one recommendation includes at least one of:
recommending a Radio Access Technology (RAT) from the at least one RAT supported by the UE for the application determined for the request, wherein the RAT is recommended using the network rating determined for the at least one RAT supported by the UE,
recommending a SIM from the at least one SIM for the application determined for the at least one service, wherein the SIM is determined using at least one of the network rating determined for the at least one SIM and characteristics of network slices available for the at least one SIM, and
recommending a network slice for the SIM to be used for the application determined for the at least one service, wherein the network slice is determined using at least one of the network rating determined for the at least one SIM and the characteristics of the network slices available for the at least one SIM,
wherein the at least one processor is further configured to receive a user input to determine the SIM and the network slice for the application recommended for the at least one service.

\* \* \* \* \*